(12) United States Patent
Weiss

(10) Patent No.: US 8,082,202 B2
(45) Date of Patent: Dec. 20, 2011

(54) MARKET-INDEXED MORTGAGE SYSTEM AND METHOD

(75) Inventor: Allan N. Weiss, Medfield, MA (US)

(73) Assignee: Market Shield Capital, LLC, Natick, MA (US)

( * ) Notice: Subject to any disclaimer, the term of this patent is extended or adjusted under 35 U.S.C. 154(b) by 0 days.

(21) Appl. No.: 12/372,441

(22) Filed: Feb. 17, 2009

(65) Prior Publication Data

US 2009/0150282 A1 Jun. 11, 2009

Related U.S. Application Data

(63) Continuation-in-part of application No. 11/553,150, filed on Oct. 26, 2006, which is a continuation of application No. 10/794,465, filed on Mar. 5, 2004, now Pat. No. 7,155,468.

(60) Provisional application No. 61/029,182, filed on Feb. 15, 2008, provisional application No. 60/453,075, filed on Mar. 7, 2003.

(51) Int. Cl.
*G06Q 40/00* (2006.01)
(52) U.S. Cl. .............. 705/36 R; 705/35; 705/37; 705/38
(58) Field of Classification Search ............. 705/35, 705/36 R, 37, 38
See application file for complete search history.

(56) References Cited

U.S. PATENT DOCUMENTS

| | | |
|---|---|---|
| 4,346,442 A | 8/1982 | Musmanno |
| 4,376,978 A | 3/1983 | Musmanno |
| 4,597,046 A | 6/1986 | Musmanno et al. |
| 4,674,044 A | 6/1987 | Kalmus et al. |
| 4,700,297 A | 10/1987 | Hagel, Sr. et al. |
| 4,774,663 A | 9/1988 | Musmanno et al. |
| 4,953,085 A | 8/1990 | Atkins |
| 5,083,782 A | 1/1992 | Nilssen |
| 5,126,936 A | 6/1992 | Champion et al. |
| 5,270,922 A | 12/1993 | Higgins |

(Continued)

FOREIGN PATENT DOCUMENTS

JP 2002-7691 1/2002

(Continued)

OTHER PUBLICATIONS

Shiller, R. J., et al., "Home Equity Insurance", National Bureau of Economic Research, Inc., Working Paper Series, Working Paper No. 4830 (Aug. 1994).

(Continued)

*Primary Examiner* — Lalita Hamilton
(74) *Attorney, Agent, or Firm* — Onello & Mello, LLP; David M. Mello

(57) ABSTRACT

A market-indexed mortgage system and method are provided that enable one or more borrowers to finance or refinance a real estate property and have at least a portion of the payments indexed to local relevant real estate values. The mortgage loan provides upfront liquidity to purchase or refinance the property; the borrower has payment stream going back to a lender (or holder of the note) wherein one or more payments are adjusted or determined based on the index. Such market-based mortgage loans can be pooled in a fund and fund shares can be issued against the fund. The mortgage can be a residential mortgage in which the regular (e.g. Monthly) payments (interest and or principal) fluctuate with a price index for the local house market. Balance upon prepayment can also fluctuate with such an index.

24 Claims, 22 Drawing Sheets

Explanation of Market Shield's Home Shield Mortgage

| | Now | Home Shield Mortgage Actual Effect | Note Signed |
|---|---|---|---|
| House Value | 200,000 | 200,000 | 200,000 |
| First LTV | 100% | 100% | |
| First Mortgage | 200,000 | 200,000 | 200,000 |
| Long Term Rate | 11.50% | 7.20% | 9.8% |
| Amortization Rate | 30 | 20 | 28 |
| Term | 30 | 20 | 30 |
| Monthly Payment | $1,980.58 | $1,574.70 | $1,739.72 |
| | | | |
| Rate first 2 years | | | 7.0% |
| Amortization first 2 years | | | $0.00 |

Catch Your Breath Period
| | |
|---|---|
| percent dscount off payment | 20% |
| first months | 24 |
| amortization | $0 |

Index effect on payment during first 15 years
| | |
|---|---|
| Max payment change +/- | 10% |
| Max Payment | $1,732.17 |

U.S. PATENT DOCUMENTS

| | | | |
|---|---|---|---|
| 5,297,032 A | 3/1994 | Trojan et al. | |
| 5,671,363 A | 9/1997 | Cristofich et al. | |
| 5,745,885 A | 4/1998 | Mottola et al. | |
| 5,765,144 A | 6/1998 | Larche et al. | |
| 5,781,654 A | 7/1998 | Carney | |
| 5,802,501 A | 9/1998 | Graff | |
| 5,806,048 A | 9/1998 | Kiron et al. | |
| 5,809,484 A | 9/1998 | Mottola et al. | |
| 5,812,988 A | 9/1998 | Sandretto | |
| 5,819,238 A | 10/1998 | Fernholz | |
| 5,826,243 A | 10/1998 | Musmanno et al. | |
| 5,890,141 A | 3/1999 | Carney et al. | |
| 5,950,175 A | 9/1999 | Austin | |
| 5,963,923 A | 10/1999 | Garber | |
| 5,987,435 A | 11/1999 | Weiss et al. | |
| 6,070,151 A | 5/2000 | Frankel | |
| 6,195,647 B1 | 2/2001 | Martyn et al. | |
| 6,249,775 B1 | 6/2001 | Freeman et al. | |
| 6,513,020 B1 | 1/2003 | Weiss et al. | |
| 2002/0082903 A1 | 6/2002 | Yasuzawa | |
| 2002/0091623 A1 | 7/2002 | Daniels | |
| 2002/0178111 A1 | 11/2002 | Woodley | |
| 2003/0110111 A1* | 6/2003 | Nalebuff et al. | 705/35 |
| 2003/0110122 A1* | 6/2003 | Nalebuff et al. | 705/38 |
| 2004/0054613 A1* | 3/2004 | Dokken | 705/36 |
| 2004/0254871 A1 | 12/2004 | Weiss | |
| 2005/0216384 A1* | 9/2005 | Partlow et al. | 705/35 |

FOREIGN PATENT DOCUMENTS

| | | |
|---|---|---|
| WO | 95/06290 | 3/1995 |
| WO | 98/13778 | 4/1998 |
| WO | 2004/013793 | 2/2004 |

OTHER PUBLICATIONS

Shiller, R.J., "Macro Markets: Creating Institutions for Managing Society's Largest Economic Risks", Oxford University Press, Oxford (Clarendon Press 1993).

Case, K.E., et al., "Index-Based Futures and Options Markets in Real Estate", The Journal of Portfolio Management, pp. 83-92 (Winter 1993).

"The SuperTrust Trust for Capital Market Fund, Inc. Shares, et al; Notice of Application", Release No. IC-17613 (Jul. 25, 1990).

Kelleher, N., "The Small Business Page Cash-for-Settlement Industry: A new Idea Turns Structured Deals into Ready $$", Boston Herald, Boston, MA, Mar. 11, 1997, p. 019).

Shiller, Robert J., "The New Financial Order: Risk in the 21st Century", Princeton University Press, 2003.

Shiller, Robert J., et al., "Moral Hazard in Home Equity Conversion", Jan. 4, 1998, pp. 1-29.

Kelleher, Nancy. "The Small Business Page Cash-for-Settlement Industry: A new Idea Turns Structured Deals into Ready $$". Boston Herald. Boston, Mass.: Mar. 11, 1997. p. 019.

"Bid.com Receives CDN$3.1 Million From Acqua Wellington Private Placement". PR Newswire. New York: Jun. 20, 2000. p. 1.

* cited by examiner

FIG. 4

| FIG. 4A | FIG. 4B | FIG. 4C | FIG. 4E | FIG. 4G | FIG. 4I | FIG. 4K | FIG. 4M | FIG. 4O | FIG. 4Q |
|---------|---------|---------|---------|---------|---------|---------|---------|---------|---------|
|         |         | FIG. 4D | FIG. 4F | FIG. 4H | FIG. 4J | FIG. 4L | FIG. 4N | FIG. 4P | FIG. 4R |

Explanation of Market Shield's Home Shield Mortgage

|  | Now | Home Shield Mortgage<br>Actual Effect | Note<br>Signed |
|---|---|---|---|
| House Value | 200,000 | 200,000 | 200,000 |
| First LTV | 100% | 100% |  |
| First Mortgage | 200,000 | 200,000 | 200,000 |
| Long Term Rate | 11.50% | 7.20% | 9.8% |
| Amortization Rate | 30 | 20 | 28 |
| Term | 30 | 20 | 30 |
| Monthly Payment | $1,980.58 | $1,574.70 | $1,739.72 |
| Rate first 2 years |  |  | 7.0% |
| Amortization first 2 years |  |  | $0.00 |

Catch Your Breath Period

| | | |
|---|---|---|
| percent discount off payment | | 20% |
| first months | | 24 |
| amortization | | $0 |
| Index effect on payment during first 15 years | | 10% |
| Max payment change +/1- | | |
| Max Payment | | $1,732.17 |

*FIG. 4A*

Underwriting Criteria
Sub prime acceptable so long as they have low delinquencies (need to quantify)
Borrower is a sub-prime because of low doc, low credit history, not delinquencies

Portfolio View
Overall Default Rate                15%
Loss per default                    $60,000
Average loss per loan               $9,000.00

| This Scenario | Scenario of index Below | Other Scenarios | |
|---|---|---|---|
| Scenario IRR | 7.73% | Index drops to 16 at 15 years | Payoff when LTV = 90% |
| Total interest foregiven | $3,350.19 | 3.61% | 7.20% |
| Total principal foregiven | $54,683.15 | | |
| | | | |
| Overall Portfolio IRR including defaults | 7.24% | 2.87% | |
| With our Fee | 0.25% | 6.99% | |
| With servicing costs | 0.25% | 6.74% | |

Then payments indexed to price index
And in 15 years you will have 60% equity per the index

*FIG. 4B*

|  |  |  | Amortization |  |  | Actual interest | If prepaid |  |
|---|---|---|---|---|---|---|---|---|
| Month | Index | % Change Applied | Payment | Interest | Principal |  | Cash flow | IRR |
|  |  |  | -200,000 |  | 200,000 | 7% | -200000 | 7.09% |
| 1 | 100 | 0.00 | 1,200 | 1200 | $199,625.30 |  | 1,200 |  |
| 2 | 99 | 0.00 | 1,200 | 1197.75181 | $199,248.35 |  | 1,200 |  |
| 3 | 98 | 0.00 | 1,200 | 1195.49013 | $198,869.15 |  | 1,200 |  |
| 4 | 97 | 0.00 | 1,200 | 1193.21488 | $198,487.66 |  | 1,200 |  |
| 5 | 96 | 0.00 | 1,200 | 1190.92597 | $198,103.89 |  | 1,200 |  |
| 6 | 95 | 0.00 | 1,200 | 1188.62334 | $197,717.81 |  | 1,200 |  |
| 7 | 94 | 0.00 | 1,200 | 1186.30689 | $197,329.42 |  | 1,200 |  |
| 8 | 93 | 0.00 | 1,200 | 1183.97654 | $196,938.70 |  | 1,200 |  |
| 9 | 92 | 0.00 | 1,200 | 1181.6322 | $196,545.63 |  | 1,200 |  |
| 10 | 91 | 0.00 | 1,200 | 1179.27381 | $196,150.21 |  | 1,200 |  |
| 11 | 90 | 0.00 | 1,200 | 1176.90126 | $195,752.41 |  | 1,200 |  |
| 12 | 89 | 0.00 | 1,200 | 1174.51447 | $195,352.23 |  | 1,200 |  |
| 13 | 88 | 0.00 | 1,200 | 1172.11337 | $194,949.64 |  | 1,200 |  |
| 14 | 87 | 0.00 | 1,200 | 1169.69786 | $194,544.64 |  | 1,200 |  |
| 15 | 86 | 0.00 | 1,200 | 1167.26785 | $194,137.21 |  | 1,200 |  |
| 16 | 85 | 0.00 | 1,200 | 1164.82327 | $193,727.34 |  | 1,200 |  |
| 17 | 85 | 0.00 | 1,200 | 1162.36402 | $193,315.00 |  | 1,200 |  |
| 18 | 84 | 0.00 | 1,200 | 1159.89001 | $192,900.19 |  | 1,200 |  |
| 19 | 83 | 0.00 | 1,200 | 1157.40116 | $192,482.90 |  | 1,200 |  |
| 20 | 82 | 0.00 | 1,200 | 1154.89737 | $192,063.09 |  | 1,200 |  |
| 21 | 81 | 0.00 | 1,200 | 1152.37857 | $191,640.77 |  | 1,200 |  |
| 22 | 80 | 0.00 | 1,200 | 1149.84465 | $191,215.92 |  | 1,200 |  |
|  |  |  |  | 1147.29552 |  |  |  |  |

FIG. 4C

How to account for to IRS, Regulators

| | | | difference | Explanation |
|---|---|---|---|---|
| | | | Interest only for two years at 7% | actual expected payment |

Payments including default loss in 2 years

| Amortization Interest | Principal | LTV | | |
|---|---|---|---|---|
| 1,200 | 200,000 | 100% | | -200,000 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |
| 1,200 | 200,000 | 100% | | 1,200 |

*FIG. 4D*

| | | | | | | | |
|---|---|---|---|---|---|---|---|
| 23 | 80 | 0.00 | 1,200 | 1144.7311 | $190,788.52 | | 1,200 |
| 24 | 80 | 0.00 | 1,200 | 1142.1513 | $190,358.55 | next quarter | 1,200 |
| 25 | 80 | 0.00 | 1,579 | 1139.55601 | $189,926.00 | 9.00% | 1,579 |
| 26 | 80 | 0.01 | 1,583 | 1136.94516 | $189,490.86 | 9.50% | 1,583 |
| 27 | 80 | 0.01 | 1,587 | 1134.31864 | $189,053.11 | 9.50% | 1,587 |
| 28 | 81 | 0.01 | 1,591 | 1131.67636 | $188,612.73 | 9.50% | 1,591 |
| 29 | 81 | 0.01 | 1,594 | 1129.01822 | $188,169.70 | 9.50% | 1,594 |
| 30 | 81 | 0.02 | 1,598 | 1126.34414 | $187,724.02 | 9.50% | 1,598 |
| 31 | 81 | 0.02 | 1,602 | 1123.65402 | $187,275.67 | 9.50% | 1,602 |
| 32 | 81 | 0.02 | 1,606 | 1120.94775 | $186,824.62 | 9.50% | 1,606 |
| 33 | 82 | 0.02 | 1,610 | 1118.22524 | $186,370.87 | 9.50% | 1,610 |
| 34 | 82 | 0.03 | 1,615 | 1115.4864 | $185,914.40 | 9.50% | 1,615 |
| 35 | 82 | 0.03 | 1,619 | 1112.73113 | $185,455.19 | 9.50% | 1,619 |
| 36 | 82 | 0.03 | 1,623 | 1109.95933 | $184,993.22 | 9.50% | 1,623 |
| 37 | 82 | 0.03 | 1,627 | 1107.17089 | $184,528.48 | 9.50% | 1,627 |
| 38 | 83 | 0.04 | 1,631 | 1104.36572 | $184,060.95 | 9.50% | 1,631 |
| 39 | 83 | 0.04 | 1,635 | 1101.54373 | $183,590.62 | 9.50% | 1,635 |
| 40 | 83 | 0.04 | 1,639 | 1098.7048 | $183,117.47 | 9.50% | 1,639 |
| 41 | 83 | 0.04 | 1,643 | 1095.84883 | $182,641.47 | 9.50% | 1,643 |
| 42 | 83 | 0.05 | 1,647 | 1092.97574 | $182,162.62 | 9.50% | 1,647 |
| 43 | 84 | 0.05 | 1,651 | 1090.0854 | $181,680.90 | 9.50% | 1,651 |
| 44 | 84 | 0.05 | 1,655 | 1087.17772 | $181,196.29 | 9.50% | 1,655 |
| 45 | 84 | 0.05 | 1,659 | 1084.25259 | $180,708.77 | 9.50% | 1,659 |
| 46 | 84 | 0.06 | 1,664 | 1081.30992 | $180,218.32 | 9.50% | 1,664 |
| 47 | 84 | 0.06 | 1,668 | 1078.34959 | $179,724.93 | 9.50% | 1,668 |
| 48 | 85 | 0.06 | 1,672 | 1075.37149 | $179,228.58 | 9.50% | 1,672 |

*FIG. 4E*

| | | | | | | |
|---|---|---|---|---|---|---|
| 1,200 | | | | | | 1,200 |
| 1,200 | | | | | | 1,200 |
| 1,575 | 200,000 | 100% | $161.09 | $1,739.72 | 1,579 | -7,421 forgiveness of interest |
| 1,573 | 199,460 | 100% | $157.14 | $1,739.72 | 1,583 | 1,583 |
| 1,572 | 198,921 | 99% | $153.18 | $1,739.72 | 1,587 | 1,587 |
| 1,571 | 198,756 | 99% | $149.22 | $1,739.72 | 1,591 | 1,591 |
| 1,570 | 198,589 | 99% | $145.24 | $1,739.72 | 1,594 | 1,594 |
| 1,568 | 198,422 | 98% | $141.25 | $1,739.72 | 1,598 | 1,598 |
| 1,567 | 198,253 | 98% | $137.26 | $1,739.72 | 1,602 | 1,602 |
| 1,565 | 198,083 | 98% | $133.25 | $1,739.72 | 1,606 | 1,606 |
| 1,564 | 197,911 | 97% | $129.24 | $1,739.72 | 1,610 | 1,610 |
| 1,563 | 197,738 | 97% | $125.21 | $1,739.72 | 1,615 | 1,615 |
| 1,561 | 197,564 | 97% | $121.17 | $1,739.72 | 1,619 | 1,619 |
| 1,560 | 197,388 | 96% | $117.13 | $1,739.72 | 1,623 | 1,623 |
| 1,558 | 197,211 | 96% | $113.07 | $1,739.72 | 1,627 | 1,627 |
| 1,557 | 197,033 | 96% | $109.00 | $1,739.72 | 1,631 | 1,631 |
| 1,556 | 196,853 | 95% | $104.93 | $1,739.72 | 1,635 | 1,635 |
| 1,554 | 196,672 | 95% | $100.84 | $1,739.72 | 1,639 | 1,639 |
| 1,553 | 196,489 | 95% | $96.74 | $1,739.72 | 1,643 | 1,643 |
| 1,551 | 196,305 | 94% | $92.64 | $1,739.72 | 1,647 | 1,647 |
| 1,550 | 196,119 | 94% | $88.52 | $1,739.72 | 1,651 | 1,651 |
| 1,548 | 195,932 | 94% | $84.39 | $1,739.72 | 1,655 | 1,655 |
| 1,547 | 195,743 | 93% | $80.25 | $1,739.72 | 1,659 | 1,659 |
| 1,545 | 195,553 | 93% | $76.10 | $1,739.72 | 1,664 | 1,664 |
| 1,544 | 195,362 | 93% | $71.94 | $1,739.72 | 1,668 | 1,668 |
| 1,542 | 195,168 | 92% | $67.77 | $1,739.72 | 1,672 | 1,672 |

FIG. 4F

| | | | | | | |
|---|---|---|---|---|---|---|
| 49 | 85 | 0.06 | 1,676 | 1072.37553 | $178,729.25 | 9.50% | 1,676 |
| 50 | 85 | 0.07 | 1,680 | 1069.36159 | $178,226.93 | 9.50% | 1,680 |
| 51 | 85 | 0.07 | 1,685 | 1066.32957 | $177,721.59 | 9.50% | 1,685 |
| 52 | 86 | 0.07 | 1,689 | 1063.27935 | $177,213.23 | 9.50% | 1,689 |
| 53 | 86 | 0.08 | 1,693 | 1060.21084 | $176,701.81 | 9.50% | 1,693 |
| 54 | 86 | 0.08 | 1,697 | 1057.12391 | $176,187.32 | 9.50% | 1,697 |
| 55 | 86 | 0.08 | 1,701 | 1054.01846 | $175,669.74 | 9.50% | 1,701 |
| 56 | 87 | 0.08 | 1,706 | 1050.89438 | $175,149.06 | 9.50% | 1,706 |
| 57 | 87 | 0.09 | 1,710 | 1047.75156 | $174,625.26 | 9.50% | 1,710 |
| 58 | 87 | 0.09 | 1,714 | 1044.58988 | $174,098.31 | 9.50% | 1,714 |
| 59 | 87 | 0.09 | 1,719 | 1041.40922 | $173,568.20 | 9.50% | 1,719 |
| 60 | 87 | 0.09 | 1,723 | 1038.20949 | $173,034.91 | 9.50% | 1,723 |
| 61 | 88 | 0.10 | 1,727 | 1034.99055 | $172,498.43 | 9.50% | 1,727 |
| 62 | 88 | 0.10 | 1,731 | 1031.7523 | $171,958.72 | 9.50% | 1,731 |
| 63 | 88 | 0.10 | 1,736 | 1028.49463 | $171,415.77 | 9.50% | 1,736 |
| 64 | 88 | 0.11 | 1,739 | 1025.2174 | $170,869.57 | 9.50% | 1,739 |
| 65 | 88 | 0.11 | 1,739 | 1021.92052 | $170,320.09 | 9.50% | 1,739 |
| 66 | 89 | 0.11 | 1,739 | 1018.60385 | $169,767.31 | 9.50% | 1,739 |
| 67 | 89 | 0.11 | 1,739 | 1015.26728 | $169,211.21 | 9.50% | 1,739 |
| 68 | 89 | 0.12 | 1,739 | 1011.91069 | $168,651.78 | 9.50% | 1,739 |
| 69 | 89 | 0.12 | 1,739 | 1008.53396 | $168,088.99 | 9.50% | 1,739 |
| 70 | 89 | 0.12 | 1,739 | 1005.13698 | $167,522.83 | 9.50% | 1,739 |
| 71 | 90 | 0.12 | 1,739 | 1001.71961 | $166,953.27 | 9.50% | 1,739 |
| 72 | 90 | 0.13 | 1,739 | 998.281732 | $166,380.29 | 9.50% | 1,739 |
| 73 | 90 | 0.13 | 1,739 | 994.823231 | $165,803.87 | 9.50% | 1,739 |
| 74 | 91 | 0.13 | 1,739 | 991.343978 | $165,224.00 | 9.50% | 1,739 |

*FIG. 4G*

| | | | | | | |
|---|---|---|---|---|---|---|
| 1,540 | 194,580 | 91% | $63.59 | 1,676 | $1,739.72 | 1,676 |
| 1,539 | 194,381 | 91% | $59.40 | 1,680 | $1,739.72 | 1,680 |
| 1,537 | 194,180 | 91% | $55.20 | 1,685 | $1,739.72 | 1,685 |
| 1,536 | 193,977 | 90% | $50.99 | 1,689 | $1,739.72 | 1,689 |
| 1,534 | 193,773 | 90% | $46.77 | 1,693 | $1,739.72 | 1,693 |
| 1,532 | 193,568 | 90% | $42.54 | 1,697 | $1,739.72 | 1,697 |
| 1,531 | 193,360 | 89% | $38.30 | 1,701 | $1,739.72 | 1,701 |
| 1,529 | 193,151 | 89% | $34.04 | 1,706 | $1,739.72 | 1,706 |
| 1,527 | 192,941 | 89% | $29.78 | 1,710 | $1,739.72 | 1,710 |
| 1,526 | 192,728 | 89% | $25.50 | 1,714 | $1,739.72 | 1,714 |
| 1,524 | 192,514 | 88% | $21.22 | 1,719 | $1,739.72 | 1,719 |
| 1,522 | 192,299 | 88% | $16.92 | 1,723 | $1,739.72 | 1,723 |
| 1,521 | 192,081 | 88% | $12.61 | 1,727 | $1,739.72 | 1,727 |
| 1,519 | 191,862 | 87% | $8.30 | 1,731 | $1,739.72 | 1,731 |
| 1,517 | 191,642 | 87% | $3.97 | 1,736 | $1,739.72 | 1,736 |
| 1,515 | 191,419 | 87% | $0.72 | 1,739 | $1,739.72 | 1,739 |
| 1,514 | 191,195 | 86% | $0.72 | 1,739 | $1,739.72 | 1,739 |
| 1,512 | 190,969 | 86% | $0.72 | 1,739 | $1,739.72 | 1,739 |
| 1,510 | 190,741 | 86% | $0.72 | 1,739 | $1,739.72 | 1,739 |
| 1,508 | 190,511 | 85% | $0.72 | 1,739 | $1,739.72 | 1,739 |
| 1,506 | 190,279 | 85% | $0.72 | 1,739 | $1,739.72 | 1,739 |
| 1,505 | 190,046 | 85% | $0.72 | 1,739 | $1,739.72 | 1,739 |
| 1,503 | 189,811 | 84% | $0.72 | 1,739 | $1,739.72 | 1,739 |
| 1,501 | 189,574 | 84% | $0.72 | 1,739 | $1,739.72 | 1,739 |
| 1,499 | 189,335 | 84% | $0.72 | 1,739 | $1,739.72 | 1,739 |
| 1,497 | 189,094 | 83% | $0.72 | 1,739 | $1,739.72 | 1,739 |

*FIG. 4H*

| | | | | | | |
|---|---|---|---|---|---|---|
| 75 | 0.14 | 1,739 | 987.843851 | $164,640.64 | 9.50% | 1,739 |
| 76 | 0.14 | 1,739 | 984.322722 | $164,053.79 | 9.50% | 1,739 |
| 77 | 0.14 | 1,739 | 980.780467 | $163,463.41 | 9.50% | 1,739 |
| 78 | 0.14 | 1,739 | 977.216958 | $162,869.49 | 9.50% | 1,739 |
| 79 | 0.15 | 1,739 | 973.632068 | $162,272.01 | 9.50% | 1,739 |
| 80 | 0.15 | 1,739 | 970.025669 | $161,670.94 | 9.50% | 1,739 |
| 81 | 0.15 | 1,739 | 966.397632 | $161,066.27 | 9.50% | 1,739 |
| 82 | 0.16 | 1,739 | 962.747826 | $160,457.97 | 9.50% | 1,739 |
| 83 | 0.16 | 1,739 | 959.076121 | $159,846.02 | 9.50% | 1,739 |
| 84 | 0.16 | 1,739 | 955.382386 | $159,230.40 | 9.50% | 1,739 |
| 85 | 0.16 | 1,739 | 951.666489 | $158,611.08 | 9.50% | 1,739 |
| 86 | 0.17 | 1,739 | 947.928296 | $157,988.05 | 9.50% | 1,739 |
| 87 | 0.17 | 1,739 | 944.167675 | $157,361.28 | 9.50% | 1,739 |
| 88 | 0.17 | 1,739 | 940.384489 | $156,730.75 | 9.50% | 1,739 |
| 89 | 0.18 | 1,739 | 936.578604 | $156,096.43 | 9.50% | 1,739 |
| 90 | 0.18 | 1,739 | 932.749884 | $155,458.31 | 9.50% | 1,739 |
| 91 | 0.18 | 1,739 | 928.898192 | $154,816.37 | 9.50% | 1,739 |
| 92 | 0.19 | 1,739 | 925.023390 | $154,170.56 | 9.50% | 1,739 |
| 93 | 0.19 | 1,739 | 921.125339 | $153,520.89 | 9.50% | 1,739 |
| 94 | 0.19 | 1,739 | 917.203899 | $152,867.32 | 9.50% | 1,739 |
| 95 | 0.19 | 1,739 | 913.258931 | $152,209.82 | 9.50% | 1,739 |
| 96 | 0.20 | 1,739 | 909.290293 | $151,548.38 | 9.50% | 1,739 |
| 97 | 0.20 | 1,739 | 905.297843 | $150,882.97 | 9.50% | 1,739 |
| 98 | 0.20 | 1,739 | 901.281438 | $150,213.57 | 9.50% | 1,739 |
| 99 | 0.21 | 1,739 | 897.240935 | $149,540.16 | 9.50% | 1,739 |
| 100 | 0.21 | 1,739 | 893.176189 | $148,862.70 | 9.50% | 1,739 |

*FIG. 4I*

| | | | | | | |
|---|---|---|---|---|---|---|
| 1,495 | 188,851 | 83% | $0.72 | 1,739 | $1,739.72 | 1,739 |
| 1,493 | 188,607 | 83% | $0.72 | 1,739 | $1,739.72 | 1,739 |
| 1,491 | 188,360 | 83% | $0.72 | 1,739 | $1,739.72 | 1,739 |
| 1,489 | 188,112 | 82% | $0.72 | 1,739 | $1,739.72 | 1,739 |
| 1,487 | 187,861 | 82% | $0.72 | 1,739 | $1,739.72 | 1,739 |
| 1,485 | 187,609 | 82% | $0.72 | 1,739 | $1,739.72 | 1,739 |
| 1,483 | 187,354 | 81% | $0.72 | 1,739 | $1,739.72 | 1,739 |
| 1,481 | 187,098 | 81% | $0.72 | 1,739 | $1,739.72 | 1,739 |
| 1,479 | 186,839 | 81% | $0.72 | 1,739 | $1,739.72 | 1,739 |
| 1,477 | 186,579 | 80% | $0.72 | 1,739 | $1,739.72 | 1,739 |
| 1,475 | 186,316 | 80% | $0.72 | 1,739 | $1,739.72 | 1,739 |
| 1,473 | 186,051 | 80% | $0.72 | 1,739 | $1,739.72 | 1,739 |
| 1,471 | 185,784 | 79% | $0.72 | 1,739 | $1,739.72 | 1,739 |
| 1,469 | 185,515 | 79% | $0.72 | 1,739 | $1,739.72 | 1,739 |
| 1,467 | 185,244 | 79% | $0.72 | 1,739 | $1,739.72 | 1,739 |
| 1,464 | 184,971 | 78% | $0.72 | 1,739 | $1,739.72 | 1,739 |
| 1,462 | 184,696 | 78% | $0.72 | 1,739 | $1,739.72 | 1,739 |
| 1,460 | 184,418 | 78% | $0.72 | 1,739 | $1,739.72 | 1,739 |
| 1,458 | 184,139 | 77% | $0.72 | 1,739 | $1,739.72 | 1,739 |
| 1,456 | 183,857 | 77% | $0.72 | 1,739 | $1,739.72 | 1,739 |
| 1,453 | 183,572 | 77% | $0.72 | 1,739 | $1,739.72 | 1,739 |
| 1,451 | 183,286 | 77% | $0.72 | 1,739 | $1,739.72 | 1,739 |
| 1,449 | 182,997 | 76% | $0.72 | 1,739 | $1,739.72 | 1,739 |
| 1,446 | 182,706 | 76% | $0.72 | 1,739 | $1,739.72 | 1,739 |
| 1,444 | 182,413 | 76% | $0.72 | 1,739 | $1,739.72 | 1,739 |
| 1,442 | 182,117 | 75% | $0.72 | 1,739 | $1,739.72 | 1,739 |

*FIG. 4J*

| | | | | | |
|---|---|---|---|---|---|
| 101 | 0.21 | 1,739 | 889.087055 | $148,181.18 | 9.50% | 1,739 |
| 102 | 0.22 | 1,739 | 884.973386 | $147,495.56 | 9.50% | 1,739 |
| 103 | 0.22 | 1,739 | 880.835034 | $146,805.84 | 9.50% | 1,739 |
| 104 | 0.22 | 1,739 | 876.671853 | $146,111.98 | 9.50% | 1,739 |
| 105 | 0.22 | 1,739 | 872.483693 | $145,413.95 | 9.50% | 1,739 |
| 106 | 0.23 | 1,739 | 868.270403 | $144,711.73 | 9.50% | 1,739 |
| 107 | 0.23 | 1,739 | 864.031834 | $144,005.31 | 9.50% | 1,739 |
| 108 | 0.23 | 1,739 | 859.767833 | $143,294.64 | 9.50% | 1,739 |
| 109 | 0.24 | 1,739 | 855.478249 | $142,579.71 | 9.50% | 1,739 |
| 110 | 0.24 | 1,739 | 851.162927 | $141,860.49 | 9.50% | 1,739 |
| 111 | 0.24 | 1,739 | 846.821713 | $141,136.95 | 9.50% | 1,739 |
| 112 | 0.25 | 1,739 | 842.454451 | $140,409.08 | 9.50% | 1,739 |
| 113 | 0.25 | 1,739 | 838.060987 | $139,676.83 | 9.50% | 1,739 |
| 114 | 0.25 | 1,739 | 833.641161 | $138,940.19 | 9.50% | 1,739 |
| 115 | 0.26 | 1,739 | 829.194816 | $138,199.14 | 9.50% | 1,739 |
| 116 | 0.26 | 1,739 | 824.721794 | $137,453.63 | 9.50% | 1,739 |
| 117 | 0.26 | 1,739 | 820.221933 | $136,703.66 | 9.50% | 1,739 |
| 118 | 0.26 | 1,739 | 815.695073 | $135,949.18 | 9.50% | 1,739 |
| 119 | 0.27 | 1,739 | 811.141052 | $135,190.18 | 9.50% | 1,739 |
| 120 | 0.27 | 1,739 | 806.559706 | $134,426.62 | 9.50% | 1,739 |
| 121 | 0.27 | 1,739 | 801.950873 | $133,658.48 | 9.50% | 1,739 |
| 122 | 0.28 | 1,739 | 797.314387 | $132,885.73 | 9.50% | 1,739 |
| 123 | 0.28 | 1,739 | 792.650081 | $132,108.35 | 9.50% | 1,739 |
| 124 | 0.28 | 1,739 | 787.957779 | $131,326.30 | 9.50% | 1,739 |
| 125 | 0.29 | 1,739 | 783.237345 | $130,539.56 | 9.50% | 1,739 |
| 126 | 0.29 | 1,739 | 778.488578 | $129,748.10 | 9.50% | $134,426.62 |

*FIG. 4K*

| | | | | | | |
|---|---|---|---|---|---|---|
| 1,439 | 181,819 | 75% | $0.72 | 1,739 | $1,739.72 | 1,739 |
| 1,437 | 181,519 | 75% | $0.72 | 1,739 | $1,739.72 | 1,739 |
| 1,435 | 181,216 | 74% | $0.72 | 1,739 | $1,739.72 | 1,739 |
| 1,432 | 180,911 | 74% | $0.72 | 1,739 | $1,739.72 | 1,739 |
| 1,430 | 180,604 | 74% | $0.72 | 1,739 | $1,739.72 | 1,739 |
| 1,427 | 180,294 | 73% | $0.72 | 1,739 | $1,739.72 | 1,739 |
| 1,425 | 179,981 | 73% | $0.72 | 1,739 | $1,739.72 | 1,739 |
| 1,422 | 179,667 | 73% | $0.72 | 1,739 | $1,739.72 | 1,739 |
| 1,420 | 179,349 | 72% | $0.72 | 1,739 | $1,739.72 | 1,739 |
| 1,417 | 179,029 | 72% | $0.72 | 1,739 | $1,739.72 | 1,739 |
| 1,415 | 178,707 | 72% | $0.72 | 1,739 | $1,739.72 | 1,739 |
| 1,412 | 178,382 | 71% | $0.72 | 1,739 | $1,739.72 | 1,739 |
| 1,410 | 178,054 | 71% | $0.72 | 1,739 | $1,739.72 | 1,739 |
| 1,407 | 177,724 | 71% | $0.72 | 1,739 | $1,739.72 | 1,739 |
| 1,404 | 177,392 | 70% | $0.72 | 1,739 | $1,739.72 | 1,739 |
| 1,402 | 177,056 | 70% | $0.72 | 1,739 | $1,739.72 | 1,739 |
| 1,399 | 176,718 | 70% | $0.72 | 1,739 | $1,739.72 | 1,739 |
| 1,396 | 176,377 | 69% | $0.72 | 1,739 | $1,739.72 | 1,739 |
| 1,394 | 176,034 | 69% | $0.72 | 1,739 | $1,739.72 | 1,739 |
| 1,391 | 175,688 | 69% | $0.72 | 1,739 | $1,739.72 | 1,739 |
| 1,388 | 175,339 | 69% | $0.72 | 1,739 | $1,739.72 | 1,739 |
| 1,385 | 174,987 | 68% | $0.72 | 1,739 | $1,739.72 | 1,739 |
| 1,383 | 174,633 | 68% | $0.72 | 1,739 | $1,739.72 | 1,739 |
| 1,380 | 174,276 | 68% | $0.72 | 1,739 | $1,739.72 | 1,739 |
| 1,377 | 173,916 | 68% | $0.72 | 1,739 | $1,739.72 | 1,739 |
| 1,374 | 173,553 | 67% | $0.72 | 1,739 | $1,739.72 | 1,739 |

FIG. 4L

| | | | | | |
|---|---|---|---|---|---|
| 127 | 103 | 0.29 | 1,739 | 773.711318 | $128,951.89 | 9.50% |
| 128 | 104 | 0.30 | 1,739 | 768.905394 | $128,150.90 | 9.50% |
| 129 | 104 | 0.30 | 1,739 | 764.070635 | $127,345.11 | 9.50% |
| 130 | 104 | 0.30 | 1,739 | 759.206867 | $126,534.48 | 9.50% |
| 131 | 104 | 0.31 | 1,739 | 754.313917 | $125,718.99 | 9.50% |
| 132 | 105 | 0.31 | 1,739 | 749.391609 | $124,898.60 | 9.50% |
| 133 | 105 | 0.31 | 1,739 | 744.439767 | $124,073.29 | 9.50% |
| 134 | 105 | 0.32 | 1,739 | 739.458214 | $123,243.04 | 9.50% |
| 135 | 105 | 0.32 | 1,739 | 734.446771 | $122,407.80 | 9.50% |
| 136 | 106 | 0.32 | 1,739 | 729.40526 | $121,567.54 | 9.50% |
| 137 | 106 | 0.33 | 1,739 | 724.3335 | $120,722.25 | 9.50% |
| 138 | 106 | 0.33 | 1,739 | 719.23131 | $119,871.88 | 9.50% |
| 139 | 106 | 0.33 | 1,739 | 714.098506 | $119,016.42 | 9.50% |
| 140 | 107 | 0.34 | 1,739 | 708.934906 | $118,155.82 | 9.50% |
| 141 | 107 | 0.34 | 1,739 | 703.740323 | $117,290.05 | 9.50% |
| 142 | 107 | 0.34 | 1,739 | 698.514574 | $116,419.10 | 9.50% |
| 143 | 108 | 0.35 | 1,739 | 693.25747 | $115,542.91 | 9.50% |
| 144 | 108 | 0.35 | 1,739 | 687.968823 | $114,661.47 | 9.50% |
| 145 | 108 | 0.35 | 1,739 | 682.648444 | $113,774.74 | 9.50% |
| 146 | 108 | 0.36 | 1,739 | 677.296143 | $112,882.69 | 9.50% |
| 147 | 109 | 0.36 | 1,739 | 671.911729 | $111,985.29 | 9.50% |
| 148 | 109 | 0.36 | 1,739 | 666.495007 | $111,082.50 | 9.50% |
| 149 | 109 | 0.37 | 1,739 | 661.045786 | $110,174.30 | 9.50% |
| 150 | 109 | 0.37 | 1,739 | 655.563869 | $109,260.64 | 9.50% |
| 151 | 110 | 0.37 | 1,739 | 650.049061 | $108,341.51 | 9.50% |
| 152 | 110 | 0.38 | 1,739 | 644.501163 | $107,416.86 | 9.50% |

*FIG. 4M*

| | | | | | | |
|---|---|---|---|---|---|---|
| 1,371 | 173,187 | 67% | $0.72 | 1,739 | $1,739.72 | 1,739 |
| 1,368 | 172,818 | 67% | $0.72 | 1,739 | $1,739.72 | 1,739 |
| 1,365 | 172,447 | 66% | $0.72 | 1,739 | $1,739.72 | 1,739 |
| 1,362 | 172,072 | 66% | $0.72 | 1,739 | $1,739.72 | 1,739 |
| 1,359 | 171,695 | 66% | $0.72 | 1,739 | $1,739.72 | 1,739 |
| 1,356 | 171,314 | 65% | $0.72 | 1,739 | $1,739.72 | 1,739 |
| 1,353 | 170,931 | 65% | $0.72 | 1,739 | $1,739.72 | 1,739 |
| 1,350 | 170,544 | 65% | $0.72 | 1,739 | $1,739.72 | 1,739 |
| 1,347 | 170,155 | 64% | $0.72 | 1,739 | $1,739.72 | 1,739 |
| 1,344 | 169,762 | 64% | $0.72 | 1,739 | $1,739.72 | 1,739 |
| 1,341 | 169,366 | 64% | $0.72 | 1,739 | $1,739.72 | 1,739 |
| 1,338 | 168,968 | 64% | $0.72 | 1,739 | $1,739.72 | 1,739 |
| 1,334 | 168,565 | 63% | $0.72 | 1,739 | $1,739.72 | 1,739 |
| 1,331 | 168,160 | 63% | $0.72 | 1,739 | $1,739.72 | 1,739 |
| 1,328 | 167,752 | 63% | $0.72 | 1,739 | $1,739.72 | 1,739 |
| 1,325 | 167,340 | 62% | $0.72 | 1,739 | $1,739.72 | 1,739 |
| 1,321 | 166,925 | 62% | $0.72 | 1,739 | $1,739.72 | 1,739 |
| 1,318 | 166,507 | 62% | $0.72 | 1,739 | $1,739.72 | 1,739 |
| 1,315 | 166,085 | 61% | $0.72 | 1,739 | $1,739.72 | 1,739 |
| 1,311 | 165,660 | 61% | $0.72 | 1,739 | $1,739.72 | 1,739 |
| 1,308 | 165,232 | 61% | $0.72 | 1,739 | $1,739.72 | 1,739 |
| 1,305 | 164,801 | 60% | $0.72 | 1,739 | $1,739.72 | 1,739 |
| 1,301 | 164,366 | 60% | $0.72 | 1,739 | $1,739.72 | 1,739 |
| 1,298 | 163,927 | 60% | $0.72 | 1,739 | $1,739.72 | 1,739 |
| 1,294 | 163,485 | 60% | $0.72 | 1,739 | $1,739.72 | 1,739 |
| 1,291 | 163,040 | 59% | $0.72 | 1,739 | $1,739.72 | 1,739 |

FIG. 4N

| | | | | |
|---|---|---|---|---|
| 153 | 110 | 0.38 | 1,739 | 638.919979 | $106,486.66 | 9.50% |
| 154 | 111 | 0.38 | 1,739 | 633.305307 | $105,550.88 | 9.50% |
| 155 | 111 | 0.39 | 1,739 | 627.656947 | $104,609.49 | 9.50% |
| 156 | 111 | 0.39 | 1,739 | 621.974697 | $103,662.45 | 9.50% |
| 157 | 111 | 0.39 | 1,739 | 616.258354 | $102,709.73 | 9.50% |
| 158 | 112 | 0.40 | 1,739 | 610.507712 | $101,751.29 | 9.50% |
| 159 | 112 | 0.40 | 1,739 | 604.722567 | $100,787.09 | 9.50% |
| 160 | 112 | 0.40 | 1,739 | 598.902711 | $99,817.12 | 9.50% |
| 161 | 112 | 0.41 | 1,739 | 593.047936 | $98,841.32 | 9.50% |
| 162 | 113 | 0.41 | 1,739 | 587.158032 | $97,859.67 | 9.50% |
| 163 | 113 | 0.41 | 1,739 | 581.232788 | $96,872.13 | 9.50% |
| 164 | 113 | 0.42 | 1,739 | 575.271993 | $95,878.67 | 9.50% |
| 165 | 114 | 0.42 | 1,739 | 569.275434 | $94,879.24 | 9.50% |
| 166 | 114 | 0.43 | 1,739 | 563.242895 | $93,873.82 | 9.50% |
| 167 | 114 | 0.43 | 1,739 | 557.174161 | $92,862.36 | 9.50% |
| 168 | 114 | 0.43 | 1,739 | 551.069014 | $91,844.84 | 9.50% |
| 169 | 115 | 0.44 | 1,739 | 544.927236 | $90,821.21 | 9.50% |
| 170 | 115 | 0.44 | 1,739 | 538.748608 | $89,791.43 | 9.50% |
| 171 | 115 | 0.44 | 1,739 | 532.532908 | $88,755.48 | 9.50% |
| 172 | 116 | 0.45 | 1,739 | 526.279914 | $87,713.32 | 9.50% |
| 173 | 116 | 0.45 | 1,739 | 519.989402 | $86,664.90 | 9.50% |
| 174 | 116 | 0.45 | 1,739 | 513.661147 | $85,610.19 | 9.50% |
| 175 | 116 | 0.46 | 1,739 | 507.294922 | $84,549.15 | 9.50% |
| 176 | 117 | 0.46 | 1,739 | 500.8905 | $83,481.75 | 9.50% |

FIG. 40

| | | | | | | |
|---|---|---|---|---|---|---|
| 1,287 | 162,591 | 59% | $0.72 | 1,739 | $1,739.72 | 1,739 |
| 1,284 | 162,138 | 59% | $0.72 | 1,739 | $1,739.72 | 1,739 |
| 1,280 | 161,682 | 58% | $0.72 | 1,739 | $1,739.72 | 1,739 |
| 1,276 | 161,222 | 58% | $0.72 | 1,739 | $1,739.72 | 1,739 |
| 1,273 | 160,759 | 58% | $0.72 | 1,739 | $1,739.72 | 1,739 |
| 1,269 | 160,292 | 57% | $0.72 | 1,739 | $1,739.72 | 1,739 |
| 1,265 | 159,821 | 57% | $0.72 | 1,739 | $1,739.72 | 1,739 |
| 1,261 | 159,347 | 57% | $0.72 | 1,739 | $1,739.72 | 1,739 |
| 1,258 | 158,868 | 56% | $0.72 | 1,739 | $1,739.72 | 1,739 |
| 1,254 | 158,386 | 56% | $0.72 | 1,739 | $1,739.72 | 1,739 |
| 1,250 | 157,900 | 56% | $0.72 | 1,739 | $1,739.72 | 1,739 |
| 1,246 | 157,411 | 55% | $0.72 | 1,739 | $1,739.72 | 1,739 |
| 1,242 | 156,917 | 55% | $0.72 | 1,739 | $1,739.72 | 1,739 |
| 1,238 | 156,420 | 55% | $0.72 | 1,739 | $1,739.72 | 1,739 |
| 1,234 | 155,918 | 55% | $0.72 | 1,739 | $1,739.72 | 1,739 |
| 1,230 | 155,413 | 54% | $0.72 | 1,739 | $1,739.72 | 1,739 |
| 1,226 | 154,904 | 54% | $0.72 | 1,739 | $1,739.72 | 1,739 |
| 1,222 | 154,390 | 54% | $0.72 | 1,739 | $1,739.72 | 1,739 |
| 1,218 | 153,873 | 53% | $0.72 | 1,739 | $1,739.72 | 1,739 |
| 1,214 | 153,351 | 53% | $0.72 | 1,739 | $1,739.72 | 1,739 |
| 1,210 | 152,826 | 53% | $0.72 | 1,739 | $1,739.72 | 1,739 |
| 1,206 | 152,296 | 52% | $0.72 | 1,739 | $1,739.72 | 1,739 |
| 1,201 | 151,762 | 52% | $0.72 | 1,739 | $1,739.72 | 1,739 |
| 1,197 | 151,223 | 52% | $0.72 | 1,739 | $1,739.72 | 1,739 |

*FIG. 4P*

| | | | | | | |
|---|---|---|---|---|---|---|
| 177 | 117 | 0.47 | | 1,739 | 494.447652 | $82,407.94 | 9.50% |
| 178 | 117 | 0.47 | | 1,739 | 487.966146 | $81,327.69 | 9.50% |
| 179 | 118 | 0.47 | | 1,739 | 481.445751 | $80,240.96 | 9.50% |
| 180 | 118 | 0.48 | | 1,739 | 474.886234 | $79,147.71 | 9.50% |
| | | | | $94,344.15 | | |

| | | | | | |
|---|---|---|---|---|---|
| 1,193 | 150,681 | 51% | $0.72 | 1,739 | $1,739.72 | 1,739 |
| 1,189 | 150,134 | 51% | $0.72 | 1,739 | $1,739.72 | 1,739 |
| 1,184 | 149,583 | 51% | $0.72 | 1,739 | $1,739.72 | 1,739 |
| 1,180 | 149,027 | 60% | $0.72 | 1,739 | $1,739.72 | 1,739 |
| | | 0% | $3,350.19 | | | $94,344.15 |

*FIG. 4R*

MARKET-INDEXED MORTGAGE SYSTEM AND METHOD

CROSS REFERENCES TO RELATED APPLICATIONS

This application claims the benefit of priority under 35 U.S.C. §119(e) from co-pending, commonly owned U.S. provisional patent application Ser. No. 61/029,182, entitled MARKET-INDEXED MORTGAGE SYSTEM AND METHOD, filed Feb. 15, 2008. This application is also a continuation-in-part of co-pending U.S. patent application Ser. No. 11/553,150, entitled COMMON INDEX SECURITIES, filed Oct. 26, 2006, which is a continuation of U.S. patent application Ser. No. 10/794,465, filed Mar. 5, 2004, entitled COMMON INDEX SECURITIES, now U.S. Pat. No. 7,155,468, which claimed priority under 35 U.S.C. §119 (e) to U.S. Provisional Patent Application Ser. No. 60/453, 075, entitled SMALL BUSINESS LIQUID SECURITIES, filed Mar. 7, 2003.

This application is also related to U.S. patent application Ser. No. 12/115,287, entitled INDEX-BASED LIQUIDITY SYSTEM AND METHOD, filed May 5, 2008.

FIELD OF THE INVENTION

The inventive concepts relate to systems and methods useful in the field of financial investments, and more particularly related to systems and methods for financing real estate.

BACKGROUND

In a typical scenario, some companies can achieve a degree of liquidity by offering shares in the company on a stock exchange. In such a case, an investment in the company comes with risks to the investor that are not only related to the industry, but also to the company itself. Such risk may stem from the potential of mismanagement of the company, loss of key employees, and so on. Individuals, or funds, may purchase shares in a variety of companies in an attempt to offset any idiosyncratic risks attributable to individual companies. But, in the end, the investors risk is still a function of the individual performance of the companies of which he owns shares.

While many companies can gain liquidity through "going public", some companies or other entities do not meet the investment community's requirements to do so. For example, in some situations, small business owners may desire to sell part of their business for diversification purposes or to raise capital to invest back into the business. This can be difficult with a small, privately held business. Capital markets are not open to the small businesses because of their size and lack of accounting audits. So this path remains unavailable to small businesses, while being quite available to many larger businesses.

Small businesses can sometimes sell a stake, ranging from a minority stake to up to a 100% stake, to private investors or private equity firms, but they tend to sell at a low price to earnings ratio. And, the terms of such investment can often be considered unattractive to the small business. For example, a certain amount of control of the small business may also be required in the exchange for capital from the investor. On the other hand, investors who might benefit through investments in these businesses do not have a convenient liquid way to do so. Typically, to buy into a small business an investor must go through a fairly involved and costly assessment process. And, selling the stake in the small business may also be a complicated and lengthy process.

In the case of real estate, financing to purchase or refinance a property is typically accomplished by taking out a mortgage loan. The interest rate of the mortgage loan is based on the prime lending rate. The mortgage loans are typically either fixed rate or adjustable rate. With fixed rate loans the interest is fixed for the life of the loan, so the monthly payments are fixed for the life of the loan, although the last payment may be marginally different from the others. With adjustable rate mortgage loans the interest rate may be fixed for an initial period (e.g., 3 years) and then adjusted periodically thereafter. The adjustment is based on changes to the prime lending rate. With these loans, the borrower's payments can change significantly once the loan goes into adjustment. Borrowers typically try to refinance to a fixed rate mortgage loan when this happens if the rates have increased materially. However, if relevant real estate values have decreased the borrower could end up with very little equity or even negative equity in the property—which can be an insurmountable impediment to refinancing. Therefore, the borrower could be left with adjusted mortgage loan payments that it can not afford to make, which can ultimately lead to foreclosure.

SUMMARY OF THE INVENTION

A market-indexed mortgage system and method are provided that enable one or more borrowers to finance or refinance a real estate property and have at least a portion of the payments indexed to local relevant real estate values. The mortgage loan provides upfront liquidity to purchase or refinance the property; the borrower has payment stream going back to a lender (or holder of the note) wherein one or more payments are adjusted or determined based on the index. Such market-based mortgage loans can be pooled in a fund and fund shares can be issued against the fund.

The mortgage can be a residential mortgage in which the regular (e.g. Monthly) payments (interest, principal, or both) fluctuate with a relevant market index for the local house market, e.g., a rental index, price index, or some combination thereof.

A balance upon prepayment can also fluctuate with a rental index, price index, or some combination thereof.

The principal, interest, or both can be adjusted in proportion (e.g., same percentage) to the index or could be adjusted according to a formula that takes the index as an input.

There can be an upfront payment by the borrower that will offset some of the risk taken by the lender. The upfront payment can come in the form of "points" that can be paid directly (e.g., with cash) by the borrower or financed. The upfront liquidity to the borrower is the mortgage loan used to purchase the property.

The adjustment can be done after an initial grace period or can commence immediately. The adjustment can be periodic, e.g., every month, every quarter, or every year. Or the adjustment could be threshold based, e.g., adjusted every time the index changes by at least a certain percentage or when the index crosses some predefined threshold or thresholds.

Additionally, as discussed above, such market-indexed mortgage loans could be pooled in a fund and shares could be issued against the fund.

In accordance with one aspect of the invention, provided is a computer-based method of indexing mortgages to a market index, with method steps carried out by one or more processors accessing one or more electronic information sources. The method comprises: storing a cash value representing a pool of cash associated with a fund that gives loans for the financing or refinancing of a class of real property and defining at least one index representative of market values of real property in the class. The method also includes, for each of a plurality of borrowers: allocating cash from the pool of cash to a borrower for financing or refinancing an identified real property in the class, and adjusting the cash value of the fund to indicate the transfer; calculating time-based payments to be made by the borrower to the fund based on the cash allocated to the borrower; and adjusting one or more of the payments using the index, and storing values representing the adjusted one or more payments. Adjustments in the time-based payments reflect changes in market values associated with the class.

The method can further comprise issuing shares against the fund.

The method can include adjusting only a portion of the payments using the index.

The index can comprise a real estate price index.

The index can comprise a real estate rental index.

Prepayment of at least some of the payments can be adjusted based on the index.

One or more of the payments can include principal and interest, where only the interest is adjusted using the index.

One or more of the payments can include principal and interest, where only the principal is adjusted using the index.

One or more of the payments can include principal and interest, where both the principal and the interest are adjusted using the index.

At least some of the payments can be interest only payments, and the interest can be calculated using the index.

The adjusting of one or more of the payments using the index can be done periodically.

In accordance with another aspect of the invention, provided is a market index mortgage adjustment system. The system comprises: a fund processor configured to store a cash value representing a pool of cash associated with a fund that gives loans for the financing or refinancing of a class of real property; a index processor configured to define at least one index representative of market values of real property in the class; and an account processor. The account processor is configured to, for each of a plurality of borrowers: allocate cash from the pool of cash to a borrower for financing or refinancing an identified real property in the class; calculate time-based payments to be made by the borrower to the fund based on the cash allocated to the borrower; and adjust one or more of the payments using the index, and storing values representing the adjusted one or more payments. Adjustments in the time-based payments reflect changes in market values associated with the class.

The system can further comprise a trading processor configured to issue shares against the fund.

The account processor can be configured to adjust only a portion of the payments using the index.

The index can comprise a real estate price index.

The index can comprise a real estate rental index.

The account processor can be further configured to adjust prepayment of at least some of the payments based on the index.

One or more of the payments can include principal and interest, where the account processor adjusts only the interest using the index.

One or more of the payments can include principal and interest, where the account processor adjusts only the principal using the index.

One or more of the payments can include principal and interest, where the account processor adjusts both the principal and the interest using the index.

At least some of the payments can be interest only payments, and the account processor can be configured to calculate the interest using the index.

The account processor can be configured to periodically adjust the one or more of the payments using the index.

BRIEF DESCRIPTION OF THE DRAWINGS

The figures depict preferred embodiments that illustrate various aspects of the invention by way of example, not by way of limitation. In the figures, like reference numerals refer to the same or similar elements.

FIGS. 4A-4R provide a spreadsheet depicting particulars of a real estate mortgage loan example in accordance with aspects of the present invention, and FIG. 4 provides a chart indicating how FIGS. 4A-4R combine to form the complete spreadsheet.

DETAILED DESCRIPTION OF THE PREFERRED EMBODIMENTS

Figure 1:
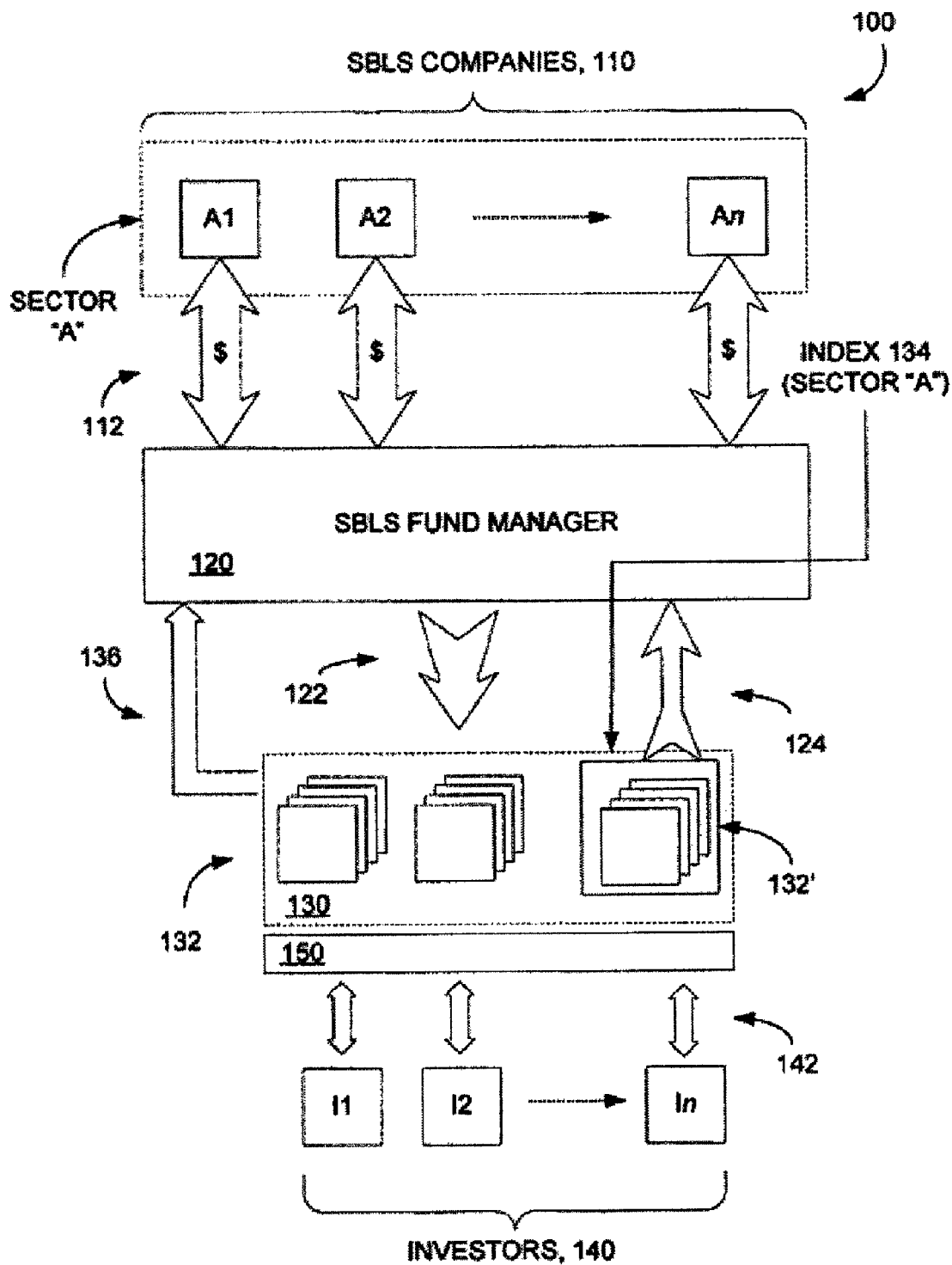
FIG. 1 is a block diagram of an embodiment of a common index securities system in accordance with aspects of the present invention.

A system and method for providing a common index fund is provided. The fund is configured such that the entities receive upfront liquidity (or consideration) in exchange for subsequent consideration back to the fund with the magnitude of that subsequent consideration being a function of an index that is related to the small businesses. Shares can be offered against the fund, publicly, privately or some combination thereof, or not at all. If offered, the shares could be offered in different classes.

The common index securities system and method could be implemented as a small business liquid security (SBLS) system and method that enables investment in one or more "small businesses" (or entities) relatively easily. An SBLS system in accordance with this embodiment enables the creation, issuance, trading and management of SBLS shares based on those businesses as an ordinary liquid equity investment tradable on a stock exchange, like shares of any publicly traded company. Since an SBLS fund is a form of a common index fund, the value contributed by each small business (and any other entity represented in the fund) is preferably indexed to, for example, an industry-wide performance index rather than each entity's individual performance. SBLS shares may be traded publicly, privately or some combination thereof, or not at all.

The businesses that participate in the fund may be of any size, so a combination of sizes of businesses may be represented. In the SBLS embodiment, a "small business" may a business defined by certain agencies or governmental regulations as a "small business" based on criteria relating to the size of the business, such as its number of employees, gross revenue, and so on. The phrase "small business" as used herein is also meant to comprise businesses or entities not traded or traditionally tradable as a liquid security, such as:

(1) any entity which is generally considered by the financial community as not suitable for an initial public offering (IPO) or public trading, (2) any entity which was once publicly traded, but has since been de-listed, (3) a subsidiary, affiliate of a business, even if that business is traded publicly or privately or (4) any other entity not publicly traded, regardless of size, or profitability, (5) a source of income flowing from one or more individuals or entities, (6) a partnership or joint venture, (7) a university or not-for-profit organization, or (8) any combination of the foregoing. As examples, a start-up company, educational institution, not for profit or charitable institution, or individual (e.g., a home owner or other property owner) or group of individuals may each be a "small business" within the context of the present invention. A fund in accordance with the present invention may represent any of the foregoing, along with businesses having stock that is publicly traded, or tradable.

The fund can be formed as any type of traditional fund, or can take other forms, such as a bank or other entity with an available pool of cash. The fund can represent entities from one or more defined classes. The classes could be industry based, such as a defined class for oil companies, as just one example. As another example, a class may represent a certain sector, or limited number of sectors, of an industry. And changes in an index associated with the fund could represent, in whole or in part, performance or earnings associated with that industry sector or sectors, or industries or sectors that are related thereto.

FIG. 1 shows a block diagram of a representative common index securities system in accordance with the aspects of the present invention. In this embodiment, the common index securities system is an SBLS system 100—meaning at least one entity represented by the fund is a small business, as that phrase is used herein. As will be appreciated by those skilled in the art, system 100 could just as easily be a common index securities system that does not include a small business. It will also be appreciated by those skilled in the computer arts and investment arts, that the present invention is not limited to the explicit structure of FIG. 1.

An SBLS fund 130 may specialize in a particular industry sector or sub-sector (collectively "Sector"), shown as Sector A in FIG. 1, as a predefined class. The Sector may be narrowed by having a sub-sector focus, such as a geographical focus based on a country, region, or several countries. The SBLS fund 130 may be created and managed, as shown by arrow 122, by a fund manager 120 (or fund management system). The fund manager can issue shares 132 against the SBLS fund 130. Shares 132 can be offered publicly, e.g., on an exchange 150, offered privately, or not offered at all. That is, the shares 132 need not ever be offered for trade or listed on an exchange.

The SBLS fund manager 120 forms relationships with one or more businesses or companies 110 (e.g., businesses A1, A2, . . . An) in at least one class or sector of interest, e.g. Sector A, to form SBLS fund 130, including at least one small business. The SBLS fund manager 120 could reach individual business owners through alliances with commercial banks, brokerage firms, leasing companies, franchise companies or other sources of commercial loans. Such distribution, networking and solicitation may be accomplished electronically via the SBLS computer architecture 300 shown in FIG. 3, by more traditional means or by some combination thereof.

The fund manager 120 provides upfront liquidity to each business in the form of cash, marketable securities, or both, as indicated by arrow 112. Additionally, or alternatively, one or more business could receive shares in the SBLS fund, which may later become liquid and/or begin paying distributions.

Such businesses 110 could receive SBLS shares 132, whether marketable or not, received by the fund manager 120 via arrow 136. The fund manager 120 may also obtain shares 132' for itself, as indicated by arrow 124. The subset of shares 132' is determined by allocating a number of shares to a company (e.g., A1) based on that company's buy-in and then applying left over amounts from the buy-in to purchase shares 132' for the fund manager 120.

In return for the upfront liquidity provided by the SBLS fund 130 to the small businesses 110 via arrow 112, the SBLS fund 130 receives subsequent payments from the small businesses 110. The subsequent payments may take the form of an ongoing payment stream or a limited number of payments from the businesses, also indicated by arrows 112. At least one payment, or payment obligation, in the payment stream owed by each business is subject to change according to changes in an index 134 corresponding to the class (or industry sector).

For example, the payments could be allowed to float with the index during a fund term with adjustments at predetermined times, e.g., monthly or quarterly, in one embodiment. In another embodiment, the payments could remain fixed for most of the term, with one or more adjustable payments at the end of the term. In this latter embodiment, a "payment obligation" could be defined that floats with the index during the term, even though the payment itself is fixed for most of the term. If the payment obligation is lower than the fixed payment, then more principal could be paid off or the excess could be banked, but if the payment obligation is higher than the fixed payment, then more could be owed when the one or more payments adjust at the end of the term. Thus, if the fixed payment were set at $1,000/mo., and the index went down such that the payment obligation was only $900 for a given month, then the extra $100 could be applied toward principal or banked in an account against future payments or payment obligations (i.e., when the payment obligation exceeded the $1,000 for the month). In still other embodiments, the one or more adjusted payments need not be only at the end of the term, they could be period, e.g., once every year or once every five years.

In the preferred form, the payment stream owed by each business A1, A2, . . . An 110 would decline in negative economic circumstances and rise in positive economic circumstances—because the index 134 would decline in negative circumstance and rise in positive economic circumstances. But there may be embodiments where a reciprocal relationship can be implemented. In some embodiments a lower cap, an upper cap, or both could be applied to the payment stream.

Since the businesses 110 can receive shares 132 of the SBLS fund 130, a business A1 can also be an investor, e.g., investor I1. If the SBLS shares 132 are traded, then others can also invest. Regardless, SBLS fund investors 140 (e.g., investors I1, I2, . . . In) receive earnings that change in proportion to changes in the index 134, because each entity's payments are tied to the index. As mentioned above, index 134 may be an index for the overall industry sector or sectors comprising the businesses 110. Because the fund's performance is indexed to the industry, rather than the individual businesses' performance, the investors are not exposed to individual business mismanagement, fraud or other idiosyncratic risk, aside from outright bankruptcy, of individual businesses in the SBLS fund 130. Accordingly, the value of the fund, and that of the fund's shares, and any dividends paid out, are not relative to any individual business' earnings, revenues, expenses, cash flow or other performance or condition measure. To mitigate bankruptcy risk, for example, a guarantor (not shown) may be included in the system of FIG. 1 (or FIG. 2) to back-up the obligations of the companies 110 represented by the fund.

In the small business embodiment, the small business owner can "go public" with a portion of its shares and receive close to a publicly traded level of price to earnings (PE) ratios, while the party that issues the SBLS shares 132 can also realize a profit from the remaining portion of the arbitrage between private business PE ratios and those for publicly traded companies, as explained in greater detail below. Even when there are no small businesses represented by the fund, the same benefits are available to other types of entities and may be preferred to going public—even if available to such an entity. Of course, an entity could be publicly traded, and also be represented in a common index fund.

The value of the fund, thus the value of the fund shares, is based on the payments made to the fund by the companies represented in the fund, which is a function of the index. The index 134 may be a published index for the industry sector, if such an index exists, or it could be an index derived from one or more of other relevant parameters, for example: (1) the performance of a set of companies that is representative of the businesses in the fund or an industry associated with the fund, (2) one or more composite indices, (3) performance information related to companies within the fund (e.g., earnings, debt) or the sector or sectors, (4) generally available economic or financial indicators or rates (e.g., prime interest rate, unemployment, commodity prices, or cost of living), or (5) information of tangential or complimentary activity. In short, there is no particular constraint placed on the one or more indices used, other than they provide some meaningful relationship to the fund or small businesses represented by the fund. Among other things, the index or indices used may be geographically, regionally, politically or nationally oriented.

As will happen from time-to-time, a business, e.g., business A2, may be acquired. In such a case, and if the fund is structured to permit it, the rights and obligations of acquired business A2 can transfer to the new owner of the business A2. Subsequently, A2 (and its new owner) could be released from the fund if it resolves its payment stream obligations. It could also sell back its shares, or continue to hold them. Such provisions are preferably established at fund formation. Otherwise, such an acquisition could force a mandatory elimination or buy-out of A2 from the SBLS fund, which could carry a penalty. During the term a business may wish to pull-out of the fund for other reasons (e.g., to go public on its own). A similar buy-out may be allowed in such cases.

Some benefits of the single industry SBLS fund 130 approach shown in FIG. 1 can include:
1) Each SBLS fund 130 can specialize in one industry sector or sub-sector so investors and analysts can understand and choose investments they like.
2) The SBLS fund 130 takes only industry risk, not idiosyncratic business risk of any individual business in the fund (except, potentially, bankruptcy risk).
3) There are no fraud or management accountability issues regarding the individual businesses in the SBLS fund 130 or, at the very least, they are diluted enough to make them non-factors relative to investing in one business.
4) The individual business owner diversifies away some of his business risk.
5) The individual business owner retains the incentive to run his business for maximum profit because he keeps the entire amount that his profit growth exceeds that of the index.
6) The obligations of the individual business to pay an amount indexed to the performance of it its industry should be acceptable because the small business owner would presume that such obligation will track the individual businesses performance to a large degree.

Figure 2:
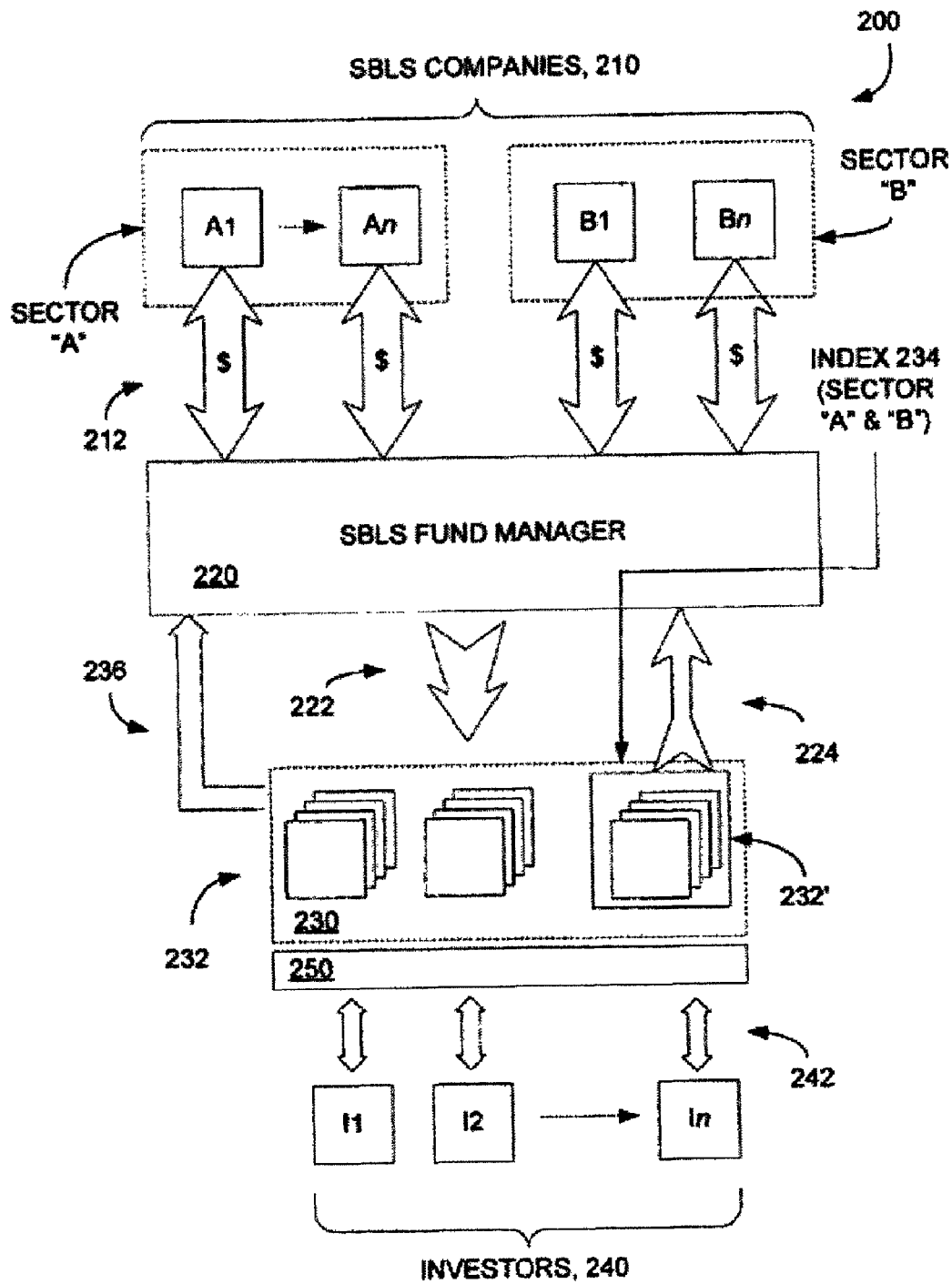
FIG. 2 is a block diagram of an alternate embodiment of a common index securities system, in accordance with aspects of the present invention.

In some forms, more than one industry or class may be represented in a SBLS fund, as is shown in FIG. 2. As an example, an SBLS fund 230 could represent two industry sectors A and B having significantly different volatility. In such a case, the SBLS fund 230 would not only be a composite of several companies 210, but also of several sectors or classes, offering to investors 240 a risk/reward opportunity that is a hybrid of the two. The risk/reward could be weighted according to the representation of each sector in the SBLS fund 230. For some investors, this hybrid SBLS fund 230 could provide a more attractive risk/reward than any one industry represented in the SBLS fund could offer by itself.

Otherwise, the SBLS fund 230 functions similar that of the SBLS fund 130 of FIG. 1. That is, SBLS shares 232 are issued against the SBLS fund 230 by the SBLS fund manager 220 (or management system). Because the payments made by the companies in the fund are tied to an index, the value the fund and the SBLS shares 232, and thus any related payouts to investor share holders 240, fluctuates in response to index 234. Index 234 may comprise one or more indices derived from or related to Sectors A and B. The payouts could also be made as a function of a blend of the index 234 and profits of the businesses, or other applicable or predetermined revenue sources or parameters.

The companies 210 from these sectors buy-in and receive upfront liquid assets, such as cash, marketable securities or both, indicated by arrows 212. The businesses could receive SBLS shares 232 via fund manager 220, also indicated by arrow 212, which need not necessarily be liquid. The fund manager 220 may obtain these SBLS shares 232 from the SBLS fund 230 as indicated by arrow 236. In exchange for the upfront liquidity or other assets, the businesses 210 agree to make subsequent payments to the fund, e.g., regular payments based on earnings. The amount of the payments is preferably adjusted according to index 234, which may be any type of index described herein, but having a relationship to the businesses represented in the fund. Therefore, a rise in the index for the industry or industries, or their sectors, causes a corresponding rise in the payments to be made by the companies 210. A corresponding arrangement for payments to decrease in response to a lower than expected index could also be accommodated. In any event, a rise in the companies' payments causes a corresponding rise in the value of the fund, and thus the fund's shares.

The fund manager 220 may also receive a subset of SBLS shares 232', indicated by arrow 224. The subset of shares 232' is determined by allocating a number of shares to a company (e.g., company B1) based on that company's buy-in and then applying left over amounts from the buy-in to purchase shares 232' for the fund manager 220. The SBLS fund's investors 240 purchase shares 232 from the fund 230, e.g., publicly through an exchange 250 or privately. Again, some or all of these investors 240 may be the businesses 210 represented in the SBLS fund 230. The value of the fund, thus the values of the fund shares, is based on the payments made to the fund, along with other market factors, which is based on or related to the index 234. In lieu of, or in addition to, receiving shares 232', the fund manager may receive compensation in other forms, e.g., a portion of the payments made by companies 210.

Exemplary Structure of Arrangement Between a Business and SBLS Fund

This example demonstrates the single sector SBLS fund, but those skilled in the art can easily extrapolate from this example to functioning in a multi-sector SBLS fund. Among the benefits to the businesses is up-front liquidity, as mentioned. Another benefit of the underlying structure of the relationship between the businesses and the SBLS fund 130 is to allow the SBLS fund 130 to share in the financial performance of the business Sector A through payments by individual businesses 110 in the chosen sector and enable fair and attractive tax treatment between the two entities, i.e., SBLS fund 130 and the companies 110 in the fund. In the hybrid or multi-sector SBLS fund, these benefits may be applied to several sectors represented within a single hybrid SBLS fund.

To accomplish these goals, the structure may be debt with some equity-like aspects or it could be all equity. One exemplary structure is:

Proportion of Business: up to 20%
Basic Structure: Equity
Payments: Quarterly payment, floats with profits from business sector
Form of Payment to Business Owners: Cash, or stock in the SBLS fund 130
Criteria for Accepting Businesses into the SBLS Fund 130 may include, as examples:
1) Verification of correct industry sector
2) Existence of bank loans, or other debt
3) Credit history or worthiness
4) Existence and aging of receivables
5) Personnel issues
6) Availability of collateral
7) Availability of personal guarantees
8) Investor, partner, or other business relationships effecting likelihood of success of business As an example, a new SBLS fund 130 may be formed of companies 110 that are in the business of delivering home heating oil. Therefore, Sector A represents the home heating oil sector. Individual companies will be approached by commercial banks who make an introduction to the fund managers with whom they do business. The companies are screened and the selected companies 110 are offered the opportunity to receive SBLS fund shares 132 in return for paying in up to 20% of their current profits, indexed to a home heating oil delivery company earnings index 134.

For example, if a particular company A1 earns $1 million per year, it could begin by committing to pay in $200,000 per year, see arrow 112. A buy-in ratio is initially set by the fund creator/manager 120 to 15, so A1's payment is deemed to be worth $3 million in shares at market value. In this example, each share 132 in the SBLS fund 130 is initially set to earn $1 per year and the expected trading price of the shares is $20, because the PE is expected to be 20. The PE ratio (e.g., 20), earning per share (e.g., $1), and buy-in ratio (e.g., 15) are all determined initially. As with other securities, the PE ratio and earnings per share are subject to ongoing change. Additionally, it is not necessary that all shares are issued to a company at buy-in; the number of shares could be allowed to float with the performance of the SBLS fund 120.

The earnings per share is a relatively arbitrary figure that need not have any relationship to the sector. The PE ratio may be based on historical performance of the given sector, e.g., a PE of 20 may be about the average for companies in the sector. The buy-in ratio is set by the SBLS fund manager 120 to provide an attractive opportunity to the businesses, while also making the opportunity attractive for the SBLS fund manager 120.

In this exemplary scenario, therefore, the company A1 would receive 150,000 shares, e.g., $3M/$20 per share. This follows the general equation:

(PAYMENT×BI RATIO)/PE=# SHARES TO COMPANY ($200k×15)/20=150k shares

However, the $200,000 buy-in paid by company A1 enables the creation of a total of 200,000 shares total, each with earning initially set at $1. Therefore, there are an additional 50,000 shares, determined by the equation:

(PAYMENT/SHARE EARNING)−# SHARES TO COMPANY=# SHARES TO FUND MGR

[$200K/($1/share)]−150,000 shares=50k shares

These extra 50,000 shares 132' are profits to the manager 120 of the SBLS fund 120, indicated by arrow 124.

Variations on the above approach may also be accommodated. The myriad variations possible include adjusting any of the structure parameters used in the example above, as would be appreciated by those skilled in the investment or financial arts. For example, some possible variations include:
1) The index 134 can be made a function of the revenues of a set of businesses or on business profits within a certain geography.
2) The payment by the businesses to the SBLS fund 120 could vary by each business's revenues or some kind of standardized profits paradigm. For example, the formula could increase buy-in payments to the SBLS fund pay-ins by businesses over time to increase fund value
3) The businesses need not be concentrated solely in one industry, but additionally or alternatively be chosen or classified by geography or size or some other classification.
4) Represent in the SBLS fund not just businesses, but other types of entities, such as professional practices or even individual incomes and then make the index a function of the profession e.g. dentists, baseball players, musicians, actors, CEOs.
5) As mentioned above, as a form of hybrid SBLS fund, a diverse set of businesses may be grouped to form a more balanced fund, potentially reducing industry related risk.
6) The index 134 could be any type relevant index, composite index (e.g., S&P 500, Dow Jones Industrial Average, Nikkei) or combination of indices or other economic parameters or indicators (e.g., interest rates).
7) Interest payments and/or dividend payments could be made based on periodic criteria, event driven criteria (or stimuli), including threshold criteria, or some combination thereof. 8) The SBLS fund could represent, at least in part, bundles of receivables (e.g., present, future or a combination thereof), contract proceeds, or marketable rights (e.g., present, future or a combination thereof).

An example of adjusted criteria is as follows:
1) Proportion of Business: up to 20%
2) Basic Structure: Equity
3) Payments: Quarterly payment, floats with profits from business sector Real Estate Mortgage Embodiment Aspects of the present invention can be implemented in a wide variety of contexts, including, but not limited to, a real estate mortgage context. In this embodiment, a real estate owner (or purchaser) can be a small business (e.g., an individual or group of individuals), referred to here as the "borrower." Upfront liquidity provided to the borrower can take the form of a mortgage loan used to buy or refinance a real estate property (e.g., a residence of the individual(s)). The mortgage loan can be indexed to real estate values in the relevant market, as opposed to prime lending rate based interest rates. At least some of the mortgage payments can be adjusted in response to changes in the relevant real estate index.

The mortgage can be a residential mortgage in which the regular (e.g. Monthly) payments (interest and or principal) fluctuate with a local housing market index, e.g., a rental index, price index, or some combination thereof. Balance upon prepayment can also fluctuate with a rental index, price index, or some combination thereof, as examples.

Embodiment 1

Refinance

Presume that the borrower has a $200,000 home in the Boston, Mass. area and a $200,000 mortgage with a 30 year amortization. The interest rate is 11.5%, resulting in a monthly payment of $1,980.58. FIGS. 4A-4R provide a spreadsheet depicting particulars of this real estate mortgage loan embodiment, and FIG. 4 provides a chart indicating how FIGS. 4A-4R combine to form the complete spreadsheet.

Summary of Market-Indexed Mortgage:

The real estate will be refinanced with a market-indexed mortgage that will have lower payments than the current mortgage. The payments will be indexed and adjusted using a relevant market index, which will result in an interest rate lower that the interest rate of the current mortgage loan.

At the end of a first period, in this embodiment 15 years, the borrower will have 60% equity in the home. The 60% equity will be determined based on the home's value at this point in time, using the value at loan origination (as a "current value") that is adjusted by overall price change during this time. This adjustment, therefore, is an adjustment based on a price index in the relevant real estate market.

Market-Indexed Mortgage Payments:

In this embodiment, payments start with a "catch your breath" period, e.g., for two years payments will be $1,200 per month, interest only. But this is not required is all embodiments.

Thereafter, payments will reflect a rate of 7.2% (as an example), which is $1,574.70 per month payment, as shown in FIG. 4A.

The monthly payment can be adjusted up or down by up to 10% with respect to the original payment, adjusted according to the percent change in overall house values in the relevant market (e.g., Boston area home prices), i.e., the index, as follows:

Maximum payment can be $1,739.72
Minimum payment can be $1,417.23
If the payment is any amount lower than $1,739.72 it will count as forgiven interest.

In 15 Years:

A value of the home will be calculated by adjusting the current value of $200,000 by the change in overall Boston home prices. For example, if prices are up 20%, the assumption will be that the home is worth $240,000. The mortgage loan balance will then be adjusted so that there is 60% equity in the home, leaving 40% of the $240,000 to pay. Any reduction will count as debt forgiveness. From this point the borrower can continue with the market-indexed mortgage, which will be fixed at 7.2% with 10 years amortization. The borrower can refinance this loan at any time, preferably with no prepayment penalty. Balance reduction will be the lower of the amount if it were 7.2% interest or achieving 60% equity.

Such market-based mortgage loans can be pooled in a fund and fund shares can be issued against the fund. This can be done in a manner similar to that discussed above with respect to FIGS. 1 and 2.

Embodiment 2

In this embodiment presume that a borrower (or borrowers) wants to purchase a property (e.g., new home) or refinance a property (e.g., an existing home). In particular, presume that, in this embodiment, the borrower wants to purchase a home for $1,000,000 in the Boston, Mass. area and intends to put $200,000 down. The borrower may be reluctant to buy in a downward trending market, or one predicted to turn downward in the near future.

Summary of Market-Indexed Mortgage:

The real estate will be financed (or refinanced) with a market-indexed mortgage with payments indexed to and adjusted using a relevant market index. That is, principal, interest, or both can be adjusted in proportion (e.g., same percentage) to the index or could be adjusted according to a formula that takes the index as an input.

In this embodiment, there will be an upfront payment by the borrower that will offset some of the risk taken by the lender. The upfront payment can come in the form of "points" that can be paid directly (e.g., with cash) by the borrower or financed. The upfront liquidity to the borrower will be the mortgage loan used to purchase the property.

In this embodiment, the home is purchased for $1,000,000 and the borrower puts $200,000 down, leaving a balance of $800,000. The borrower's upfront payment can be $50,000, which can be financed as part of the loan making the principal amount $850,000. Otherwise, in another embodiment, the mortgage loan can be $800,000 (e.g., as a first mortgage) and a second loan for $50,000 can be taken out (e.g., as a second mortgage). In yet another embodiment, the borrower pays the $50,000 in cash and the mortgage loan is for $800,000.

For a market-indexed mortgage loan for $850,000, amortized over 30 years and having an interest rate of 6.0%, the principal and interest payment would be $5,096.18 and the borrower would have $150,000 equity.

Adjustment:

The adjustment can be done after an initial grace period (e.g., 2 years) or can commence immediately. The adjustment can be periodic, e.g., every month, every quarter, or every year. Or the adjustment could be threshold based, e.g., adjusted every time the index changes by at least 2% or crosses some other predefined threshold or thresholds.

In this embodiment the relevant market index could be the prices of homes in the Boston area. The adjustment is monthly. So, if home prices in the Boston area fall 2% in a month, the borrower's total payment (i.e., principal and interest) goes down 2%, i.e., from to $4,994.26. If the index then went up 3% the next month the borrower's total payment goes up to $5,144.08.

In still other embodiments, the rate could be adjusted by the index. Thus, if the initial rate was 6.0% and the index went down 2% the rate could also go down 2% to 5.88%. But if the index then went up 3% the rate could again be adjusted to 6.056%.

In other embodiments, the rate could remain fixed and the principal could be adjusted using the index.

While this embodiment has been described in a purchase context, this approach could also be applied in a refinance context, as will be appreciated by those skilled in the art. Additionally, as discussed above, such loans could be pooled in a fund and shares could be issued against the fund.

Computer Architecture

An SBLS system may be embodied in a network of computer devices, which may included wired, e.g. fiber optic, wireless and other communication means. Such computers may include personal computers, servers, workstations, personal digital assistants (PDAs), cell phones, pagers, e-mail devices, and so on. Any of which may process, store, operate on, present, or communicate SBLS related data and execute SBLS functionality. See also FIG. 3 and the related discussion herein.

Figure 3:
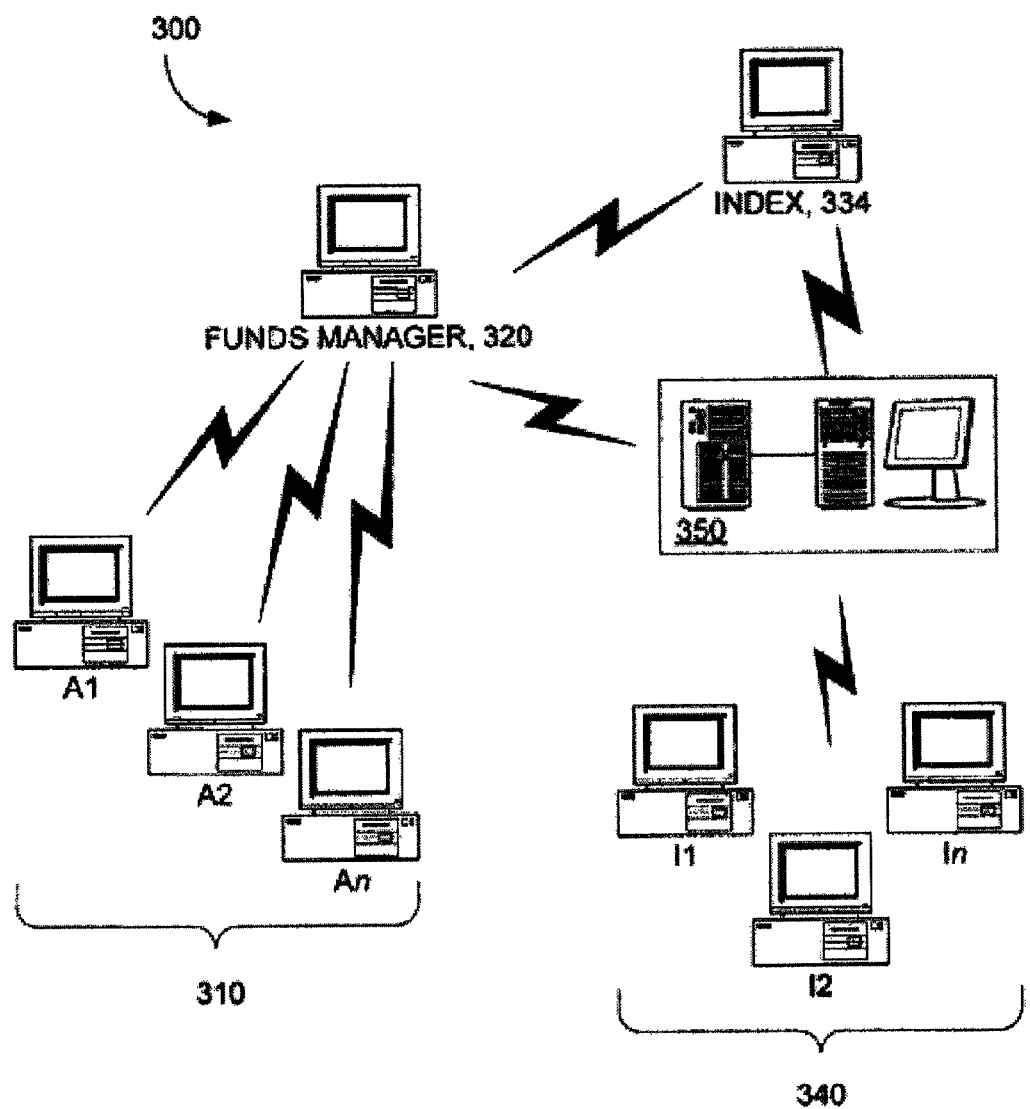
FIG. 3 is a top level embodiment of a computer architecture which could be used to implement the systems of FIG. 1 and FIG. 2.

FIG. 3 provides one possible architecture 300 for implementing an SBLS system and method. In this case, architecture 300 implements the SBLS system 100 of FIG. 1. A funds management system 330 provides the overall administration of the fund, which may include modules that create the fund and establish all of the relevant parameters and selection of the businesses A1, A2, . . . An, and associated systems 310, processing the buy-ins and distributions with the businesses, and interaction with an exchange system 350 for offering, trading, and redeeming the SBLS shares, if required. Investors, using investor systems 340 investors I1, I2, . . . In, may access the exchange 350 for the trading and redeeming of shares. The businesses represented in the SBLS fund 130 may also be considered investors. At least one of the fund management system 330 or exchange system 350 can link to index systems 334, which can serve as the source or sources of index data for the purpose of influencing or adjusting the value of the payments by small businesses 110, and therefore the SBLS fund 130.

Functionality of the SBLS funds management system 330 may be embodied in one or more of program code, processors, and/or modules, which can be collocated in a single system, or distributed among a plurality of systems that could be remote to each other. SBLS system program code and SBLS data may be stored in any known form of computer storage device or system. The SBLS functionality and data may be collocated or distributed among a plurality of systems or subsystems. Similarly, functionality and data of other relevant entities may be embodied in program code, processors, and/or modules resident in any of a variety of storage devices or systems. Third party systems may be accessible via any of a variety of now known or hereafter developed networks.

Figure 5:
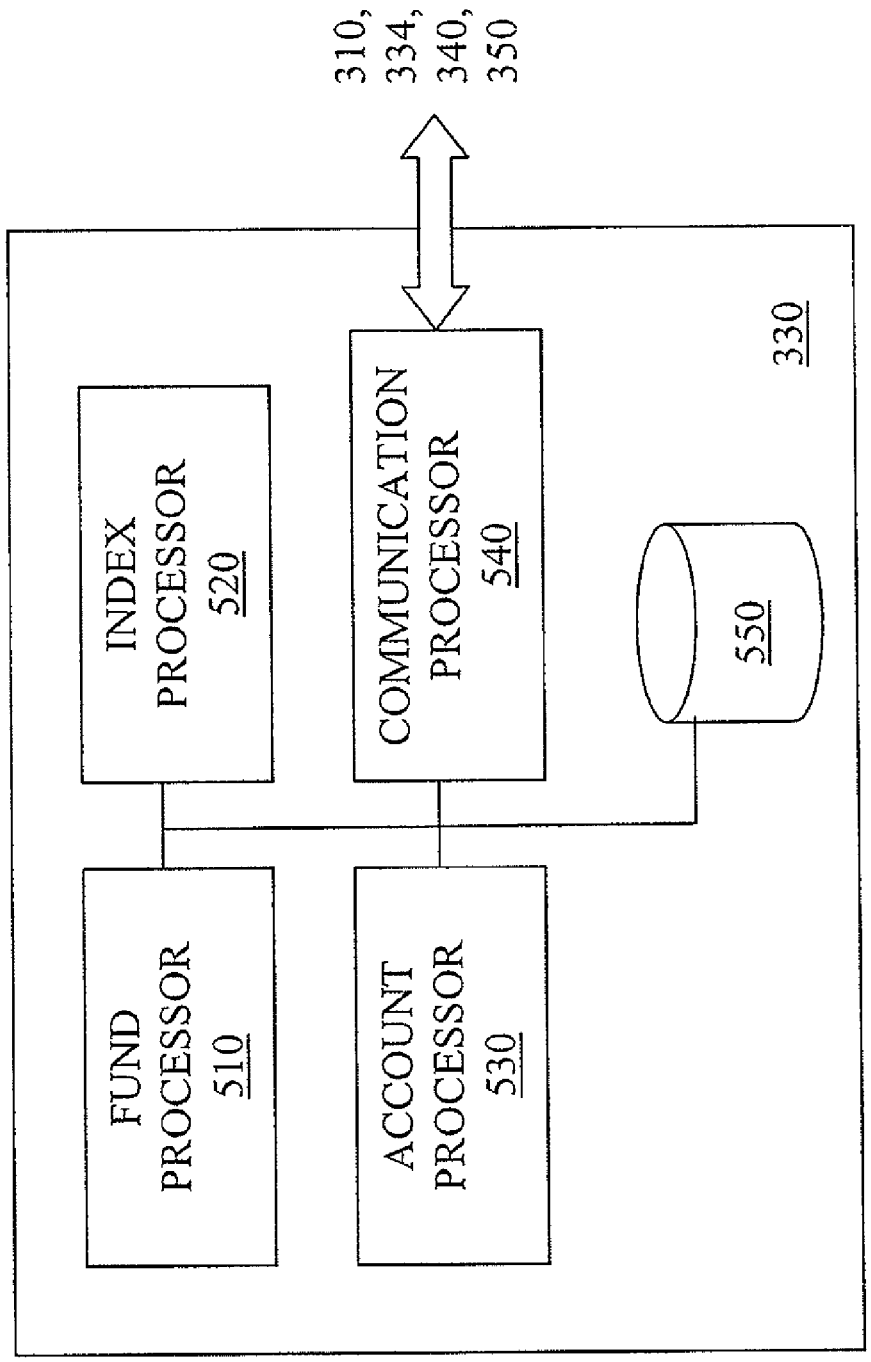
FIG. 5 shows an embodiment of processors that may be included in an SBLS funds management system.

FIG. 5 shows an embodiment of processors that may be included in an SBLS funds management system 330. The SBLS funds management system 330 can include a fund processor 510, a index processor 520, an account processor 530, and a communication processor 540. Data and other relevant information used and/or generated by these processors can be stored in database base system 550. Database system 550 may be collocated with the SBLS fund management system 330 (as shown), may be remote to it, or may be distributed among local and remote databases and database systems.

The fund processor 510 can be configured to manage a pool of cash in association with a defined fund, e.g., Boston Residential Real Estate Fund. The fund processor 510 identifies the pool of cash, and tracks changes to its value, e.g., as distributions are made, such as mortgage loans, and payments are received, such as from the borrowers (or small businesses). The fund definition and structure (i.e., parameters) and pool of cash account, or information necessary to access such data in a different system, can be stored in database system 550.

The index processor 520 receives index information for the fund and generates the index from the index information. As examples, the index processor 520 may calculate the index from the index information. Or the index information may include an index from a third party provider and the index processor can supply that as the index used for payment adjustments. The index module 520 can receive a plurality of indexes and create a composite index. The index processor can receive one or more third party index along with other pertinent market information and create an index from them. The index can also be used to adjust the value of balances, payments, or both, of individual loans within the fund. The index can also be used to determine the value of the fund. Index identifications and sources, index component definitions and sources, index calculation formulas, and index values can be stored in database system 550.

The account processor 530 can manage an account for each borrower in the fund, and store such information as fund balances, payment obligations, and adjustments to one or more thereof. That is, the account processor can make adjustments to the payment obligations of borrowers in accordance with at least one index. The account processor 530 can also apply payments received with respect to individual accounts. Account information can be stored in database system 550, including, as examples, identifications, account numbers, account balances, payment obligations, bank routing information, and payment histories for borrowers.

The communication processor 540 can interface with external systems to facilitate communication with the fund processor 510, index processor 520, and account processor 530. For example, the fund processor 510 may communicate with a trading system to facilitate the trading of shares in the fund. The index processor 520 can communicate with providers of real estate market information useful for generating and/or applying at least one real estate market index to the payment obligations of borrowers. The account processor 530 can use the communication processor 540 to process electronic funds transfers, process loan applications, perform credit reporting, and do electronic billing—as examples. The database system 550 can include information and data necessary to communicate with the other processors and external systems—as required, including systems accessible via the Internet and World Wide Web. Information and data necessary to allow the SBLS fund management system 330 to serve as an information provider to borrowers, share holders, etc. can also be stored in database system 550.

As will be appreciated by those skilled in the art, program code and data necessary to implement functions of the various processors discussed above can also be stored in database system 550. Also, the present invention is not limited to the above types of processors, these are representative of an embodiment, but not a limitation of the invention.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A computer-based method of indexing mortgages to at least one market index, carried out by one or more processors accessing one or more electronic information sources, the method comprising:

aggregating cash amounts received from a plurality of investors into a pool of cash;

defining at least one index representative of market values of real property in a class of real property;

for each of a plurality of borrowers, wherein the plurality of borrowers includes owners of real property in the class being financed or refinanced with market-indexed mortgage loans:

allocating cash from the pool of cash to a borrower for financing or refinancing an identified real property in the class as a market-indexed mortgage loan;

calculating time-based payments to be made by the borrower as a loan repayment obligation, based on the cash allocated to the borrower; and electronically adjusting one or more of the payments using the at least one index, and storing values representing the adjusted one or more payments, wherein adjustments in the time-based payments reflect changes in market values associated with the class of real property; and pooling market-indexed mortgage loans of the plurality of borrowers in a fund that issues one or more class of shares or units to investors, including shares or units whose values fluctuate in response to the at least one index.

2. The method of claim 1, further comprising issuing shares against the fund.

3. The method of claim 1, wherein the method includes adjusting only a portion of the payments using the index.

4. The method of claim 1, wherein the index comprises a real estate price index.

5. The method of claim 1, wherein the index comprises a real estate rental index.

6. The method of claim 1, wherein prepayment of at least some of the payments is adjusted based on the index.

7. The method of claim 1, wherein one or more of the payments include principal and interest and only the interest is adjusted using the index.

8. The method of claim 1, wherein one or more of the payments include principal and interest and only the principal is adjusted using the index.

9. The method of claim 1, wherein one or more of the payments include principal and interest and both the principal and the interest are adjusted using the index.

10. The method of claim 1, wherein at least some of the payments are interest only payments, and the interest is calculated using the index.

11. The method of claim 1, wherein the adjusting of one or more of the payments using the index is done periodically, wherein the period is 1 year or less.

12. A market index mortgage adjustment system, comprising:

a fund processor configured to aggregate cash amounts received from a plurality of investors into a pool of cash;

an index processor configured to define at least one index representative of market values of real property in a class of real property;

an account processor configured to, for each of a plurality of borrowers, wherein the plurality of borrowers includes owners of real property in the class being financed or refinanced with market-indexed mortgage loans:

allocate cash from the pool of cash to a borrower for financing or refinancing an identified real property in the class as a market-indexed mortgage loan;

calculate time-based payments to be made by the borrower, as a loan repayment obligation, based on the cash allocated to the borrower; and adjust one or more of the payments using the at least one index, and storing values representing the adjusted one or more payments, wherein adjustments in the time-based payments reflect changes in market values associated with the class of real property; and the fund processor further configured to pool market-indexed mortgage loans of the plurality of borrowers in a fund that issues one or more class of shares or units to investors, including shares or units whose values fluctuate in response to the at least one index.

13. The system of claim 12, further comprising:

a trading processor configured to issue shares against the fund.

14. The system of claim 12, wherein the account processor is configured to adjust only a portion of the payments using the index.

15. The system of claim 12, wherein the index comprises a real estate price index.

16. The system of claim 12, wherein the index comprises a real estate rental index.

17. The system of claim 12, wherein the account processor is further configured to adjust prepayment of at least some of the payments based on the index.

18. The system of claim 12, wherein one or more of the payments include principal and interest and the account processor adjusts only the interest using the index.

19. The system of claim 12, wherein one or more of the payments include principal and interest and the account processor adjusts only the principal using the index.

20. The system of claim 12, wherein one or more of the payments include principal and interest and the account processor adjusts both the principal and the interest using the index.

21. The system of claim 12, wherein at least some of the payments are interest only payments, and the account processor is configured to calculate the interest using the index.

22. The system of claim 12, wherein the account processor is configured to periodically adjust the one or more of the payments using the index, wherein the period is 1 year or less.

23. The method of claim 1, wherein adjusting one or more of the payments using the index further includes adjusting a principal amount after an initial grace period.

24. The system of claim 12, wherein account processor is further configured to adjust the one or more of the payments using the index to include an adjustment to a principal amount after an initial grace period.

\* \* \* \* \*